US012519970B2

(12) United States Patent
Sethuraman et al.

(10) Patent No.: US 12,519,970 B2
(45) Date of Patent: Jan. 6, 2026

(54) ENCODER, A DECODER AND CORRESPONDING METHODS WITH OPTICAL FLOW REFINEMENT

(71) Applicant: HUAWEI TECHNOLOGIES CO., LTD., Guangdong (CN)

(72) Inventors: Sriram Sethuraman, Bangalore (IN); Sagar Kotecha, Beed (IN); Jeeva Raj A, Rasipuram (IN); Semih Esenlik, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 316 days.

(21) Appl. No.: 17/556,594

(22) Filed: Dec. 20, 2021

(65) Prior Publication Data
US 2022/0116648 A1 Apr. 14, 2022

Related U.S. Application Data

(63) Continuation of application No. PCT/CN2020/097297, filed on Jun. 20, 2020.

(30) Foreign Application Priority Data

Jun. 21, 2019 (IN) ............................. 201931024825

(51) Int. Cl.
*H04N 19/52* (2014.01)
*H04N 19/172* (2014.01)
(Continued)

(52) U.S. Cl.
CPC ........... *H04N 19/52* (2014.11); *H04N 19/172* (2014.11); *H04N 19/174* (2014.11);
(Continued)

(58) Field of Classification Search
None
See application file for complete search history.

(56) References Cited

U.S. PATENT DOCUMENTS 10,491,240 B1 * 11/2019 Dupont ............... G06F 16/9014
2007/0019729 A1 * 1/2007 Nakagomi ........... H04N 19/176
375/E7.176
(Continued)

FOREIGN PATENT DOCUMENTS

JP 2016519499 A 6/2016
RU 2638639 C1 12/2017
(Continued)

OTHER PUBLICATIONS

Bross et al., "Versatile Video Coding (Draft 5)", Joint Video Experts Team (JVET) of ITU-T SG 16 WP 3 and ISO/IEC JTC 1/SC 29/ WG 11, 14th Meeting: Geneva, CH, Mar. 19-27, 2019, JVET-N1001-v8.*
(Continued)

*Primary Examiner* — Edemio Navas, Jr.
(74) *Attorney, Agent, or Firm* — WOMBLE BOND DICKINSON (US) LLP

(57) ABSTRACT

It is provided a method of decoding a video bitstream implemented by a decoding device, the video bitstream including coded data for a plurality of pictures. The decoding method comprises: parsing an enabling flag for decoder motion vector refinement (DMVR) from a sequence parameter set of the video bitstream; parsing a disabling flag for DMVR from a syntax structure of a lower hierarchic syntax structure level than the sequence parameter set (SPS) level of the video bitstream; and performing DMVR based inter bi-prediction for a current block within at least one region of the current picture to obtain predicted sample values of the current block when at least one pre-defined condition is fulfilled, and wherein the at least one pre-defined condition
(Continued)

comprises that the parsed value of the disabling flag specifies that DMVR based inter bi-prediction is enabled for at least one region of the current picture.

19 Claims, 16 Drawing Sheets

(51) Int. Cl.
*H04N 19/174* (2014.01)
*H04N 19/176* (2014.01)
*H04N 19/577* (2014.01)
*H04N 19/70* (2014.01)

(52) U.S. Cl.
CPC ......... *H04N 19/176* (2014.11); *H04N 19/577* (2014.11); *H04N 19/70* (2014.11)

(56) References Cited

U.S. PATENT DOCUMENTS

| | | | |
|---|---|---|---|
| 2015/0103925 | A1 | 4/2015 | Chen et al. |
| 2018/0115787 | A1 | 4/2018 | Koo et al. |
| 2018/0270485 | A1 | 9/2018 | Jang et al. |
| 2018/0332282 | A1 | 11/2018 | He et al. |
| 2019/0132606 | A1 | 5/2019 | Su et al. |
| 2020/0107035 | A1* | 4/2020 | Li .................... H04N 19/44 |
| 2021/0235110 | A1* | 7/2021 | Liu .................... H04N 19/52 |
| 2021/0368198 | A1* | 11/2021 | Zhang ................ H04N 19/176 |
| 2021/0385481 | A1* | 12/2021 | Liu .................... H04N 19/105 |
| 2022/0038732 | A1* | 2/2022 | Jang ................... H04N 19/105 |

FOREIGN PATENT DOCUMENTS

| | | |
|---|---|---|
| TW | 201840183 A | 11/2018 |
| WO | 2014161740 A1 | 10/2014 |
| WO | 2019010156 A1 | 1/2019 |
| WO | 2019085892 A1 | 5/2019 |
| WO | 2019089933 A1 | 5/2019 |
| WO | 2020103870 A1 | 5/2020 |
| WO | 2020103872 A1 | 5/2020 |
| WO | 2020197083 A1 | 10/2020 |
| WO | 2020211867 A1 | 10/2020 |

OTHER PUBLICATIONS

Steffen Kamp et al.,"Decoder-Side Motion Vector Derivation for Block-Based Video Coding", IEEE Transactions On Circuits and Systems for Video Technology, vol. 22, No. 12, Dec. 2012, total: 14pages.

Zhou Yun et al., "Study on the Development of Video Coding Standard VVC",2016,total: 6 pages.

Benjamin Bross et al., "Versatile Video Coding (Draft 4)",oint Video Experts Team (JVET) of ITU-T SG 16 WP 3 and ISO/IEC JTC 1/SC 29/WG 11 ,13th Meeting: Marrakech, MA, Jan. 9-18, 2019,JVET-M1001-v6,JVET-N0097_DraftText,total:296pages.

Dae Young Lee et al.,"Non-CE3 : MPM flag signaling first",oint Video Experts Team (JVET) of ITU-T SG 16 WP 3 and ISO/IEC JTC 1/SC 29/WG 11,15th Meeting: Gothenburg, SE, Jul. 3-12, 2019,JVET-O0509,total:8pages.

Document: JVET-O0504-v1, Sriram Sethuraman, Non-CE9: Header flags to disable DMVR and BDOF at finer granularities, Joint Video Experts Team (JVET) of ITU-T SG 16 WP 3 and ISO/IEC JTC 1/SC 29/WG 11, 15th Meeting: Gothenburg, SE, Jul. 3-12, 2019, total 3 pages.

Document: JVET-M1001-v3, Benjamin Bross et al, Versatile Video Coding (Draft 4), Joint Video Experts Team (JVET) of ITU-T SG 16 WP 3 and ISO/IEC JTC 1/SC 29/WG 11, 13th Meeting: Marrakech, MA, Jan. 9-18, 2019, total 252 pages.

ITU-T H.264(Apr. 2017), Series H: Audiovisual and Multimedia Systems, Infrastructure of audiovisual services-Coding of moving video, Advanced video coding for generic audiovisual services, total 812 pages.

ITU-T H.265(Feb. 2018), Series H: Audiovisual and Multimedia Systems Infrastructure of audiovisual services-Coding of moving video, High efficiency video coding, total 692 pages.

Benjamin Bross et al., Versatile Video Coding (Draft 4) , JVET of ITU-T and ISO/IEC, JVET-M1001-v7 (Mar. 17, 2019), 299 pages.

Weijia Zhu et al., Non-CE8: Adaptive Fractional MVD search in DMVR for SCC , JVET of ITU-T and ISO/IEC, JVET-N0260-v1 (Mar. 13, 2019), 7 pages.

Ching-Yeh Chen et al, "CE9-related: Simplification of cascading DMVR and BDOF processes",Joint Video Experts Team (JVET) of ITU-T SG 16 WP 3 and ISO/IEC JTC 1/SC 29/WG 11,JVET-N0097-v1, 14th Meeting:Geneva, CH, Mar. 19-27, 2019,total 3 pages.

* cited by examiner

ENCODER, A DECODER AND CORRESPONDING METHODS WITH OPTICAL FLOW REFINEMENT

CROSS-REFERENCE TO RELATED APPLICATIONS

This application is a continuation of International Application No. PCT/CN2020/097297, filed on Jun. 20, 2020, which claims the priority to India Patent Application No. IN201931024825, filed on Jun. 21, 2019. The disclosures of the aforementioned applications are hereby incorporated by reference in their entireties.

TECHNICAL FIELD

Embodiments of the present application (disclosure) generally relate to the field of picture processing and more particularly to optical flow refinement.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

In particular, (Decoder Side) Motion Vector Refinement, (D)MVR, and Bi-Directional Optical Flow (BDOF) represent important techniques for improving the quality of inter-predicted pictures. However, both procedures demand for relatively high computational loads. Therefore, there is a need for deciding on the application or non-application of (D)MVR and BDOF in view of the resulting coding efficiency.

SUMMARY

Embodiments of the present application provide apparatuses and methods for encoding and decoding according to the independent claims.

The foregoing and other objects are achieved by the subject matter of the independent claims. Further implementation forms are apparent from the dependent claims, the description and the figures.

It is provided a method of encoding a video bitstream comprising coded data for a plurality of pictures implemented in an encoding device, the method comprising: determining whether decoder motion vector refinement, DMVR, based inter bi-prediction is enabled for at least one region of a current picture of the plurality of pictures; setting a value of a disabling flag (for example, a 1-bit flag) for DMVR on a lower hierarchic syntax structure level than the sequence parameter set, SPS, level based on the outcome of the determining whether DMVR based inter bi-prediction is enabled, the value of the disabling flag specifying whether or not DMVR based inter bi-prediction is enabled for at least one region of the current picture.

Contrary to the art, whether or not DMVR based inter bi-prediction is enabled is flagged on a lower hierarchic syntax structure level than the SPS level. Thereby, on a smaller granuality as compared to the art enabling or disabling, respectively, of DMVR can be signaled thereby significantly increasing the coding efficiency. For example, only some pictures of a sequence or some slices of a particular picture may be enabled for the application of DMVR whereas other pictures or slices, respectively, are not enabled.

Wherein the method of encoding may further comprises: encoding the value of a disabling flag for DMVR on a lower hierarchic syntax structure level into the video bitstream. Alternatively, the encoding the value of a disabling flag for DMVR may be directly performed without setting a value of a disabling flag (for example, a 1-bit flag) for DMVR.

For example, the at least one region of the current picture is the current picture and the disabling flag is set on the picture parameter set, PPS, level. According to another example, the at least one region of the current picture is a slice of the current picture and the disabling flag is set on the slice header level.

Particularly, it may be determined that DMVR based inter bi-prediction is disabled when at least one pre-defined condition is fulfilled. Based on the selected pre-defined condition fine-tuning of the decision process with respect to enabling or disabling DMVR can be readily achieved.

According to one aspect, the method further comprises determining motion vector differences with respect to at least one region of the current picture and at least one region of a reference picture on one side of at least one region of the current picture and at least one region of another reference picture on the other side of at least one region of the current picture, and the at least one pre-defined condition comprises that the determined motion vector differences do not have both the same absolute values and opposite signs. Application of this condition may result in reliable decision process with respect to coding efficiency.

According to another aspect, the determining whether DMVR based inter bi-prediction is enabled for the at least one region comprises: determining whether screen content is present in at least the region of the current picture, and wherein the at least one pre-defined condition comprises that it is determined that screen content is present in at least one region of the current picture. Application of this condition also may result in reliable decision process with respect to coding efficiency.

A particular manner to determine whether or not screen content is available is the following. The determining whether screen content is present in at least one region of the current picture comprises calculating N-bit hash values for blocks of at least one region of the current picture starting from each of the M samples of at least one region of the current picture, respectively, wherein N, M and K are integer values; building a hash table with K entries, wherein each of the K entries contains a count value of blocks for which N-bit hash values are calculated that are equal to a pre-defined value; and determining the sum of the entries comprising a count value larger than 1; and wherein it is determined that screen content is present in at least one region of the current picture when the determined sum of the entries exceeds a pre-defined threshold. The named blocks may consist of 4×4 samples. A suitable pre-defined threshold is given by a threshold representing a pre-defined percentage of the total number of the samples of at least one region of the current picture. By this procedure it can be reliably decided whether or not significant screen content is present.

According to an aspect, the determining whether DMVR based inter bi-prediction is enabled for the at least one region comprises: calculating first sum of costs on the prediction residuals of coding units of at least one region without performing decoder motion vector refinement based inter bi-prediction; calculating second sum of costs on the prediction residuals of the coding units of at least one region with performing motion vector refinement; and wherein it is determined that DMVR based inter bi-prediction is disabled when the calculated second sum is higher than the calculated first sum. The costs may be absolute transform differences, SATD, based costs. This criterion also may result in efficient coding. Particularly, when the at least one region of the current picture is the current picture it may be determined that DMVR inter bi-prediction is not to be enabled for succeeding pictures of the current picture when the calculated second sum is higher than the calculated first sum. Application of this condition also may result in reliable decision process with respect to coding efficiency.

The above-described embodiments may further comprise setting a value of an enabling flag for DMVR on the SPS level, the value of the enabling flag specifying whether or not DMVR based inter bi-prediction is enabled for the plurality of pictures. When this enabling flag indicates that DMVR is disabled, deciding on a lower hierarchic level whether or not DMVR is not needed, and processing load for deciding on a lower hierarchic level whether or not DMVR is enabled can be saved.

The above-described embodiments may further comprise encoding the value of the enabling flag into the video bitstream.

With respect to a decision whether or not bi-directional optical flow, BDOF, processing is enabled similar procedures to the ones described above can be performed with the same or similar advantages provided. Accordingly, it is provided a method of encoding a video bitstream comprising coded data for a plurality of pictures implemented in an encoding device, the method comprising:
  determining whether bi-directional optical flow, BDOF, inter prediction is enabled for at least one region of a current picture of the plurality of pictures;
  setting a value of a disabling flag (for example, a 1-bit flag) for BDOF on a lower hierarchic syntax structure level than the sequence parameter set level, SPS, based on the outcome of the determining whether BDOF inter prediction is enabled, the value of the disabling flag specifying whether or not BDOF inter prediction is enabled for at least one region of the current picture.

Wherein the method of encoding may further comprises: encoding the value of a disabling flag for BDOF on a lower hierarchic syntax structure level into the video bitstream.

Again, the at least one region of the current picture may be the current picture and the disabling flag may be set on the picture parameter set, PPS, level, or the at least one region of the current picture may be a slice of the current picture and the disabling flag may be set on the slice header level.

It may be determined that BDOF inter prediction is disabled when at least one pre-defined condition is fulfilled. Suitable conditions include the following. The method may comprise determining motion vector differences with respect to at least one region of the current picture and at least one region of a reference picture on one side of at least one region of the current picture and at least one region of another reference picture on the other side of at least one region of the current picture, and wherein the at least one pre-defined condition comprises that the determined motion vector differences do not have both the same absolute values and opposite signs.

Again, the method may further comprise setting a value of an enabling flag for BDOF on the SPS level, the value of the enabling flag specifying whether or not BDOF inter prediction is enabled for the plurality of pictures.

When this enabling flag indicates that BDOF is disabled, deciding on a lower hierarchic level whether or not BDOF is not needed, and processing load for deciding on a lower hierarchic level whether or not BDOF is enabled can be saved.

Again, the method may further comprise encoding the value of the enabling flag into the video bitstream.

The above-mentioned objects are also addressed by providing a method of decoding a video bitstream implemented by a decoding device, the video bitstream including coded data for a plurality of pictures, the decoding method comprising: parsing an enabling flag for decoder motion vector refinement, DMVR, from a sequence parameter set of the video bitstream, wherein the enabling flag for DMVR specifies whether or not DMVR based inter bi-prediction is enabled for the plurality of pictures associated with the sequence parameter set; parsing a disabling flag (for example, a 1-bit flag) for DMVR from a syntax structure of a lower hierarchic syntax structure level than the sequence parameter set, SPS, level of the video bitstream, wherein the disabling flag for DMVR specifies whether or not DMVR based inter bi-prediction is disabled for at least one region of a current picture associated with the syntax structure, wherein the current picture belongs to the plurality of pictures; and performing DMVR based inter bi-prediction for a current block within at least one region of the current picture to obtain predicted sample values of the current block when at least one pre-defined condition is fulfilled, and wherein the at least one pre-defined condition comprises that the parsed value of the disabling flag specifies that DMVR based inter bi-prediction is enabled.

A similar procedure with respect to enabling or disabling bi-directional optical flow processing is provided, namely, a method of decoding a video bitstream implemented by a decoding device, the video bitstream including coded data for a plurality of pictures, the decoding method comprising: parsing an enabling flag for bi-directional optical flow, BDOF, from a sequence parameter set of the video bitstream, wherein the enabling flag for BDOF specifies whether or not BDOF inter prediction is enabled for the plurality of pictures associated with the sequence parameter set; parsing a disabling flag (for example, a 1-bit flag) for BDOF from a syntax structure of a lower hierarchic syntax structure level than the sequence parameter set, SPS, level of the video bitstream, wherein the disabling flag for BDOF specifies whether or not BDOF inter prediction is disabled for at least one region of a current picture associated with the syntax structure, wherein the current picture belongs to the plurality of pictures; and performing BDOF inter prediction for a current block within at least one region of the current picture to obtain predicted sample values of the current block when at least one pre-defined condition is fulfilled, and wherein the at least one pre-defined condition comprises that the parsed value of the disabling flag specifies that BDOF inter prediction is enabled.

The at least one region of the current picture may be the current picture, the syntax structure may be a picture parameter set, PPS. The at least one region of the current picture may be a slice of the current picture, the syntax structure may be a slice header.

According to an aspect, DMVR based inter bi-prediction is performed for the current block when the parsed value of the enabling flag for DMVR specifies that DMVR is enabled.

According to another aspect, wherein the at least one pre-defined condition (further) comprises the parsed value of the enabling flag for DMVR specifies that DMVR is enabled.

According to another aspect, BDOF inter prediction is performed for the current block when the parsed value of the enabling flag for BDOF specifies that BDOF is enabled.

According to another aspect, wherein the at least one pre-defined condition (further) comprises the parsed value of the enabling flag for BDOF specifies that BDOF is enabled.

The disabling flag for DMVR may be parsed when the parsed value of the enabling flag for DMVR specifies that DMVR is enabled. Whether the disabling flag for DMVR is parsed may be based on the parsed value of the enabling flag for DMVR.

Similarly, the disabling flag for BDOF may parsed when the parsed value of the enabling flag for BDOF specifies that BDOF is enabled. Whether the disabling flag for BDOF is parsed may be based on the parsed value of the enabling flag for BDOF.

All of the above-described embodiments may be implemented in an encoder or decoder or a computer program product. The decoder and/or the encoder may comprise one or more processors and a non-transitory computer-readable storage medium coupled to the processors and storing programming for execution by the processors, wherein the programming, when executed by the processors, configures the decoder to carry out the method according to any one of the above-described embodiments. The decoder and/or the encoder also may comprise processing circuitry for carrying out the method according to any one of the above-described embodiments.

Furthermore, devices configured for carrying out the above-described method operations are provided as follows. Separately listed units of the devices may be incorporated in the same units or be represented by the same units where appropriate.

It is provided a device (may for use in an image encoder) configured for encoding a video bitstream comprising coded data for a plurality of pictures, the device comprising: a decoder motion vector refinement, DMVR, determining unit configured for determining whether DMVR based inter bi-prediction is enabled for at least one region of a current picture of the plurality of pictures; a first DMVR flag setting unit configured for setting a value of a disabling flag (for example, a 1-bit flag) for DMVR on a lower hierarchic syntax structure level than the sequence parameter set, SPS, level based on the outcome of the determining whether DMVR based inter bi-prediction is enabled, the value of the disabling flag specifying whether or not DMVR based inter bi-prediction is enabled for at least one region of the current picture.

According to an aspect, the device comprises an encoding unit is configured for encoding the value of a disabling flag for DMVR on a lower hierarchic syntax structure level into the video bitstream.

The at least one region of the current picture may be the current picture and the disabling flag may be set on the picture parameter set, PPS, level. The at least one region of the current picture may be a slice of the current picture and the disabling flag may be set on the slice header level.

According to an aspect, the DMVR determining unit is configured for determining that DMVR based inter bi-prediction is disabled when at least one pre-defined condition is fulfilled. The device may comprise a motion vector differences determining unit (which may be part of the DMVR determining unit) configured for determining motion vector differences with respect to at least one region of the current picture and at least one region of a reference picture on one side of at least one region of the current picture and at least one region of another reference picture on the other side of at least one region of the current picture, and wherein the at least one pre-defined condition comprises that the determined motion vector differences do not have both the same absolute values and opposite signs.

The determining whether DMVR based inter bi-prediction is enabled for the at least one region may comprise: determining whether screen content is present in at least the region of the current picture, and wherein the at least one pre-defined condition comprises that it is determined that screen content is present in at least one region of the current picture.

The determining whether screen content is present in at least one region of the current picture may comprise: calculating N-bit hash values for blocks of at least one region of the current picture starting from each of the M samples of at least one region of the current picture, respectively, wherein N, M and K are integer values; building a hash table with K entries, wherein each of the K entries contains a count value of blocks for which N-bit hash values are calculated that are equal to a pre-defined value; determining the sum of the entries comprising a count value larger than 1; and wherein it is determined that screen content is present in at least one region of the current picture when the determined sum of the entries exceeds a pre-defined threshold. Here, the blocks may consist of 4×4 samples. Further, the pre-defined threshold may represent a pre-defined percentage of the total number of the samples of at least one region of the current picture.

According to a further aspect, the determining whether DMVR based inter bi-prediction is enabled for the at least one region comprises: calculating first sum of costs on the prediction residuals of coding units of at least one region without performing decoder motion vector refinement based inter bi-prediction; calculating second sum of costs on the prediction residuals of the coding units of at least one region with performing motion vector refinement; and wherein it is determined that DMVR based inter bi-prediction is disabled when the calculated second sum is higher than the calculated first sum. The costs may be absolute transform differences, SATD, based costs.

When the at least one region of the current picture is the current picture the the DMVR determining unit may be configured for determining that DMVR inter bi-prediction is not to be enabled for succeeding pictures of the current picture when the calculated second sum is higher than the calculated first sum.

According to an aspect, the device comprises a second DMVR flag setting unit (which may be part of or identical with the first DMVR flag setting unit) configured for setting a value of an enabling flag for DMVR on the SPS level, the value of the enabling flag specifying whether or not DMVR based inter bi-prediction is enabled for the plurality of pictures.

According to another aspect, the device comprises an encoding unit configured for encoding the value of the enabling flag for DMVR into the video bitstream.

A similar device is provided that allows for a suitable decision on whether or not bi-directional optical flow is enabled. This device can readily be combined with the one described above.

Particularly, it is provided a device (may for use in an image encoder) configured for encoding a video bitstream comprising coded data for a plurality of pictures, the device comprising: a bi-directional optical flow, BDOF, inter prediction determining unit configured for determining whether BDOF inter prediction is enabled for at least one region of a current picture of the plurality of pictures;
  a first BDOF flag setting unit configured for setting a value of a disabling flag (for example, a 1-bit flag) for BDOF on a lower hierarchic syntax structure level than the sequence parameter set level, SPS, based on the outcome of the determining whether BDOF inter prediction is enabled, the value of the disabling flag specifying whether or not BDOF inter prediction is enabled for at least one region of the current picture.

According to an aspect, the device comprises an encoding unit configured for encoding the value of the disabling flag for BDOF into the video bitstream.

Again, the at least one region of the current picture may be the current picture and the disabling flag may be set on the picture parameter set, PPS, level. Alternatively, the at least one region of the current picture may be a slice of the current picture and the disabling flag may be set on the slice header level.

According to an aspect, the BDOF inter prediction determining unit is configured for determining that BDOF inter prediction is disabled when at least one pre-defined condition is fulfilled.

For this, the device may further comprise a motion vector differences determining unit (which may be part of the BDOF determining unit) configured for determining motion vector differences with respect to at least one region of the current picture and at least one region of a reference picture on one side of at least one region of the current picture and at least one region of another reference picture on the other side of at least one region of the current picture, and wherein the at least one pre-defined condition comprises that the determined motion vector differences do not have both the same absolute values and opposite signs.

The device may further comprise a second BDOF flag setting unit (which may be part of or identical with the first BDOF flag setting unit) configured for setting a value of an enabling flag for BDOF on the SPS level, the value of the enabling flag specifying whether or not BDOF inter prediction is enabled for the plurality of pictures.

According to another aspect, the device comprises an encoding unit configured for encoding the value of the enabling flag for BDOF into the video bitstream.

The disabling flag, in general, may be a 1-bit flag.

Furthermore, it is provided a device (may for use in an image decoder) configured for decoding a video bitstream comprising coded data for a plurality of pictures, the device comprising: a first parsing unit configured for parsing an enabling flag for decoder motion vector refinement, DMVR, from a sequence parameter set of the video bitstream, wherein the enabling flag for DMVR specifies whether or not DMVR based inter bi-prediction is enabled for the plurality of pictures associated with the sequence parameter set; a second parsing unit configured for parsing a disabling flag (for example, a 1-bit flag) for DMVR from a syntax structure of a lower hierarchic syntax structure level than the sequence parameter set, SPS, level of the video bitstream, wherein the disabling flag for DMVR specifies whether or not DMVR based inter bi-prediction is disabled for at least one region of a current picture associated with the syntax structure, wherein the current picture belongs to the plurality of pictures; and a DMVR performing unit configured for performing DMVR based inter bi-prediction for a current block within at least one region of the current picture to obtain predicted sample values of the current block when at least one pre-defined condition is fulfilled, and wherein the at least one pre-defined condition comprises that the parsed value of the disabling flag specifies that DMVR based inter bi-prediction is enabled.

Similarly, it is provided a device (may for use in an image decoder) configured for decoding a video bitstream comprising coded data for a plurality of pictures, the device comprising: a first parsing unit configured for parsing an enabling flag for bi-directional optical flow, BDOF, from a sequence parameter set of the video bitstream, wherein the enabling flag for BDOF specifies whether or not BDOF inter prediction is enabled for the plurality of pictures associated with the sequence parameter set; a second parsing unit configured for parsing a disabling flag for BDOF from a syntax structure of a lower hierarchic syntax structure level than the sequence parameter set, SPS, level of the video bitstream, wherein the disabling flag for BDOF specifies whether or not BDOF inter prediction is disabled for at least one region of a current picture associated with the syntax structure, wherein the current picture belongs to the plurality of pictures; and a BDOF performing unit configured for performing BDOF inter prediction for a current block within at least one region of the current picture to obtain predicted sample values of the current block when at least one pre-defined condition is fulfilled, and wherein the at least one pre-defined condition comprises that the parsed value of the disabling flag specifies that BDOF inter prediction is enabled.

Again, the at least one region of the current picture may be the current picture, the syntax structure may be a picture parameter set, PPS or, alternatively, the at least one region of the current picture may be a slice of the current picture, the syntax structure may be a slice header.

According to another aspect, the DMVR performing unit is configured for performing DMVR based inter bi-prediction for the current block when the parsed value of the enabling flag for DMVR specifies that DMVR is enabled.

According to another aspect, wherein the at least one pre-defined condition (further) comprises the parsed value of the enabling flag for DMVR specifies that DMVR is enabled.

According to another aspect, the BDOF performing unit may be configured for performing BDOF inter prediction for the current block when the parsed value of the enabling flag for BDOF specifies that BDOF is enabled.

According to another aspect, wherein the at least one pre-defined condition (further) comprises the parsed value of the enabling flag for BDOF specifies that BDOF is enabled.

The second parsing unit may be configured for parsing or not parsing the disabling flag for DMVR based on the parsed value of the enabling flag for DMVR. The second parsing unit may be configured for parsing or not parsing the disabling flag for BDOF based on the parsed value of the enabling flag for BDOF. The second parsing unit may be configured for parsing the disabling flag for DMVR when the parsed value of the enabling flag for DMVR specifies that DMVR is enabled. The second parsing unit may be configured for parsing the disabling flag for BDOF when the parsed value of the enabling flag for BDOF specifies that BDOF is enabled.

Again, the disabling flag, in general, may be a 1-bit flag.

It is provided a computer-readable storage medium having stored thereon instructions that when executed cause one or more processors configured to code video data is proposed. The instructions cause the one or more processors to perform a method according to any one of the above-described embodiments.

It is provided a computer program comprising program code for performing the method according to any one of the above-described embodiments when executed on a computer.

It is provided an encoded bitstream for the video signal by including a plurality of syntax elements, wherein the plurality of syntax elements comprises a disabling flag for DMVR of any one of the above-described embodiments.

Wherein the disabling flag for DMVR is conditionally signaled at least based on a value of the parsed value of the enabling flag for DMVR of any one of the above-described embodiments.

It is provided a non-transitory storage medium which includes an encoded bitstream decoded by an image decoding device, the bitstream being generated by dividing a frame of a video signal or an image signal into a plurality blocks, and including a plurality of syntax elements, wherein the plurality of syntax elements comprises a disabling flag for DMVR of any one of the above-described embodiments.

Wherein the disabling flag for DMVR is conditionally signaled at least based on a value of the parsed value of the enabling flag for DMVR of any one of the above-described embodiments.

It is provided an encoded bitstream for the video signal by including a plurality of syntax elements, wherein the plurality of syntax elements comprises a disabling flag for BDOF of any one of the above-described embodiments.

Wherein the disabling flag for BDOF is conditionally signaled at least based on a value of the parsed value of the enabling flag for BDOF of any one of the above-described embodiments.

It is provided a non-transitory storage medium which includes an encoded bitstream decoded by an image decoding device, the bitstream being generated by dividing a frame of a video signal or an image signal into a plurality blocks, and including a plurality of syntax elements, wherein the plurality of syntax elements comprises a disabling flag for BDOF of any one of the above-described embodiments.

Wherein the disabling flag for DMVR is conditionally signaled at least based on a value of the parsed value of the enabling flag for BDOF of any one of the above-described embodiments.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the disclosure are described in more detail with reference to the attached figures and drawings, in which.

Figure 1A:
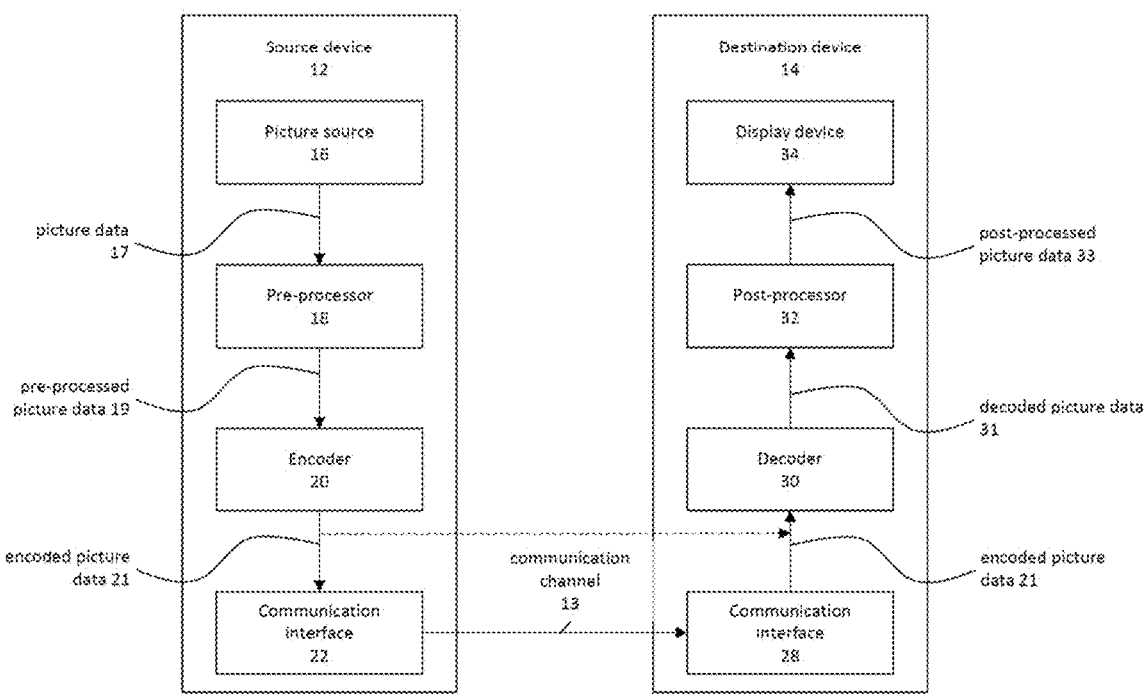
FIG. 1A is a block diagram showing an example of a video coding system configured to implement embodiments of the disclosure.

In the following identical reference signs refer to identical or at least functionally equivalent features if not explicitly specified otherwise.

DETAILED DESCRIPTION OF THE EMBODIMENTS

In the following description, reference is made to the accompanying figures, which form part of the disclosure, and which show, by way of illustration, specific aspects of embodiments of the disclosure or specific aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method operations are described, a corresponding device may include one or a plurality of units, e.g. functional units, to perform the described one or plurality of method operations (e.g. one unit performing the one or plurality of operations, or a plurality of units each performing one or more of the plurality of operations), even if such one or more units are not explicitly described or illustrated in the figures. On the other hand, for example, if a specific apparatus is described based on one or a plurality of units, e.g. functional units, a corresponding method may include one operation to perform the functionality of the one or plurality of units (e.g. one operation performing the functionality of the one or plurality of units, or a plurality of operations each performing the functionality of one or more of the plurality of units), even if such one or plurality of operations are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g. a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 1A, the coding system 10 comprises a source device 12 configured to provide encoded picture data 21 e.g. to a destination device 14 for decoding the encoded picture data 13.

The source device 12 comprises an encoder 20, and may additionally, i.e. optionally, comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be optional component.

The video encoder 20 is configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
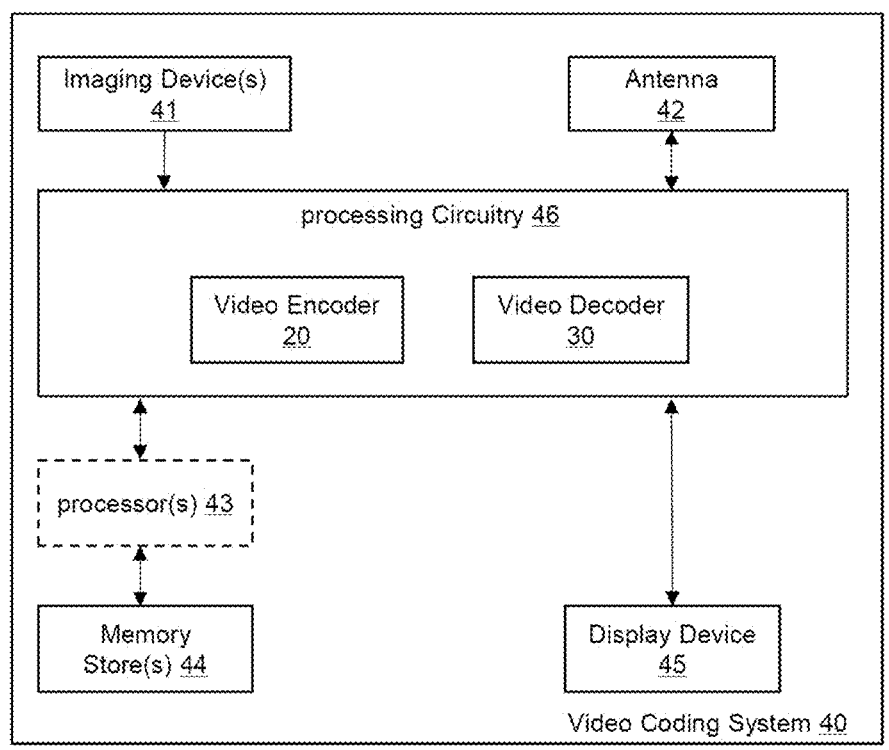
FIG. 1B is a block diagram showing another example of a video coding system configured to implement embodiments of the disclosure.

The encoder 20 (e.g. a video encoder 20) or the decoder 30 (e.g. a video decoder 30) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the disclosure are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the disclosure are not limited to HEVC or VVC.

Encoder and Encoding Method

Figure 2:
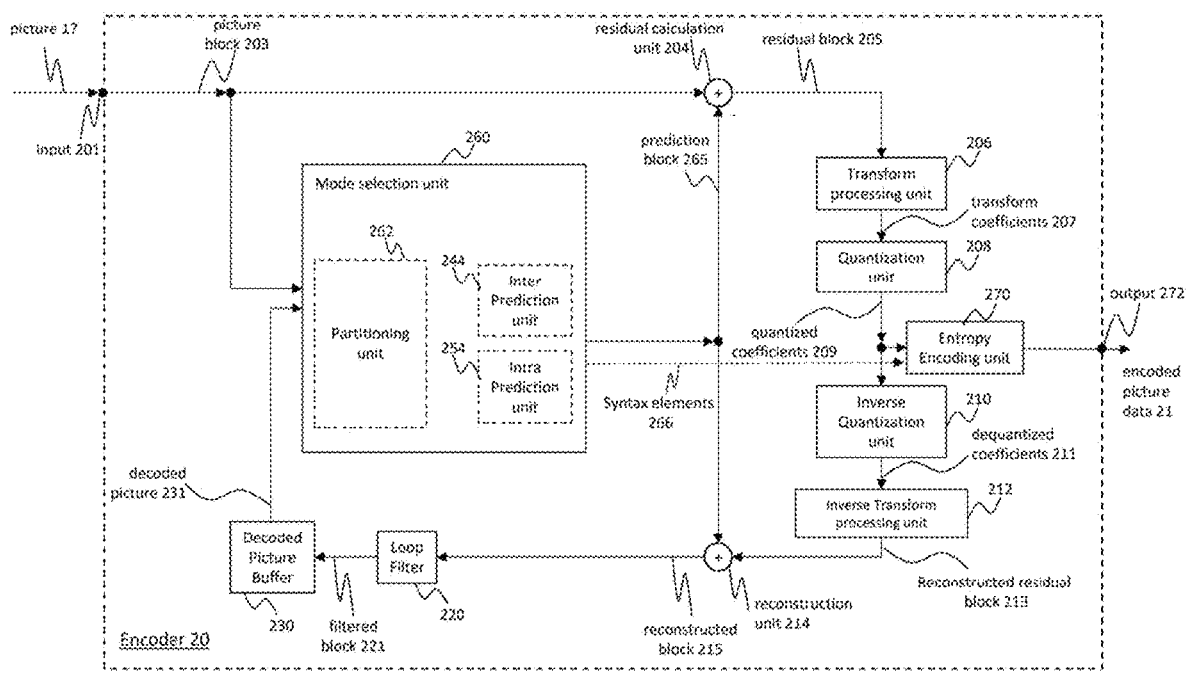
FIG. 2 is a block diagram showing an example of a video encoder configured to implement embodiments of the disclosure.

FIG. 2 shows a schematic block diagram of an example video encoder 20 that is configured to implement the techniques of the present application. In the example of FIG. 2, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
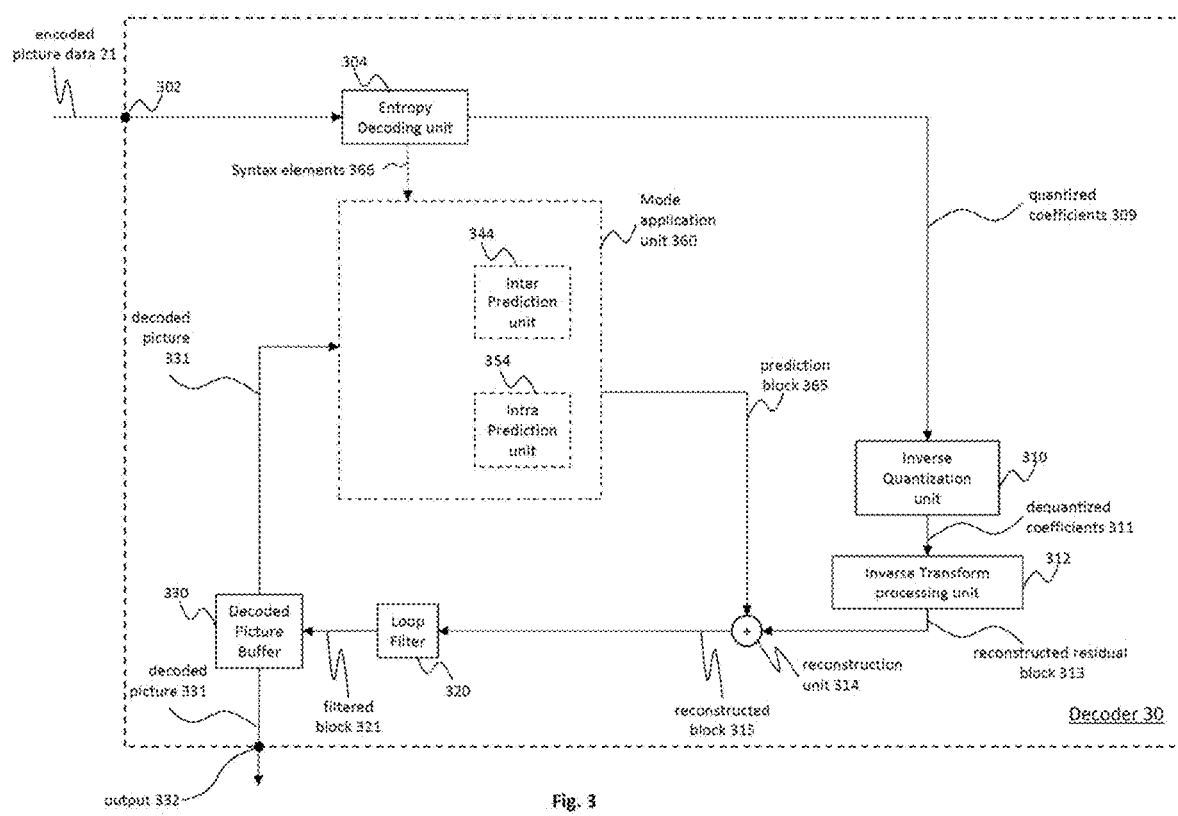
FIG. 3 is a block diagram showing an example structure of a video decoder configured to implement embodiments of the disclosure.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g. via input 201, a picture 17 (or picture data 17), e.g. picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 2 may be configured to encode the picture 17 block by block, e.g. the encoding and prediction is performed per block 203.

Embodiments of the video encoder 20 as shown in FIG. 2 may be further configured to partition and/or encode the picture by using slices (also referred to as video slices), wherein a picture may be partitioned into or encoded using one or more slices (typically non-overlapping), and each slice may comprise one or more blocks (e.g. CTUs). A slice may contain a collection of rectangular tiles or can be a collection of raster order CTU rows within a tile. A tile is divided into one or more bricks, each of which consisting of a number of CTU rows within the tile.

A tile that is not partitioned into multiple bricks is also referred to as a brick. However, a brick that is a true subset of a tile is not referred to as a tile.

A slice either contains a number of tiles of a picture or a number of bricks of a tile.

Two modes of slices are supported, namely the raster-scan slice mode and the rectangular slice mode. In the raster-scan slice mode, a slice contains a sequence of tiles in a tile raster scan of a picture. In the rectangular slice mode, a slice contains a number of bricks of a picture that collectively form a rectangular region of the picture. The bricks within a rectangular slice are in the order of brick raster scan of the slice.

Embodiments of the video encoder 20 as shown in FIG. 2 may be further configured to partition and/or encode the picture by using tile groups (also referred to as video tile groups) and/or tiles (also referred to as video tiles), wherein a picture may be partitioned into or encoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Residual Calculation

The residual calculation unit 204 may be configured to calculate a residual block 205 (also referred to as residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 may be configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit Transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the video encoder 20 (respectively quantization unit 208) may be configured to output quantization parameters (QP), e.g. directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g. an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as transform block 213.

Reconstruction

The reconstruction unit 214 (e.g. adder or summer 214) is configured to add the transform block 213 (i.e. reconstructed residual block 213) to the prediction block 265 to obtain a reconstructed block 215 in the sample domain, e.g. by adding—sample by sample—the sample values of the reconstructed residual block 213 and the sample values of the prediction block 265.

Filtering

The loop filter unit 220 (or short "loop filter" 220), is configured to filter the reconstructed block 215 to obtain a filtered block 221, or in general, to filter reconstructed samples to obtain filtered samples. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 220 is shown in FIG. 2 as being an in loop filter, in other configurations, the loop filter unit 220 may be implemented as a post loop filter. The filtered block 221 may also be referred to as filtered reconstructed block 221.

Embodiments of the video encoder 20 (respectively loop filter unit 220) may be configured to output loop filter parameters (such as sample adaptive offset information), e.g. directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, e.g. an original block 203 (current block 203 of the current picture 17), and reconstructed picture data, e.g. filtered and/or unfiltered reconstructed samples or blocks of the same (current) picture and/or from one or a plurality of previously decoded pictures, e.g. from decoded picture buffer 230 or other buffers (e.g. line buffer, not shown). The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which form again blocks), e.g. iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g. by partitioning unit 260) and prediction processing (by inter-prediction unit 244 and intra-prediction unit 254) performed by an example video encoder 20 will be explained in more detail.

Partitioning

The partitioning unit 262 may partition (or split) a current block 203 into smaller partitions, e.g. smaller blocks of square or rectangular size. These smaller blocks (which may also be referred to as sub-blocks) may be further partitioned into even smaller partitions. This is also referred to tree-partitioning or hierarchical tree-partitioning, wherein a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

As mentioned before, the term "block" as used herein may be a portion, in particular a square or rectangular portion, of a picture. With reference, for example, to HEVC and VVC, the block may be or correspond to a coding tree unit (CTU), a coding unit (CU), prediction unit (PU), and transform unit (TU) and/or to the corresponding blocks, e.g. a coding tree block (CTB), a coding block (CB), a transform block (TB) or prediction block (PB).

For example, a coding tree unit (CTU) may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate colour planes and syntax structures used to code the samples. Correspondingly a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU.

In embodiments, e.g., according to the latest video coding standard currently in development, which is referred to as Versatile Video Coding (VVC), a combined Quad-tree and binary tree (QTBT) partitioning is for example used to partition a coding block. In the QTBT block structure, a CU can have either a square or rectangular shape. For example, a coding tree unit (CTU) is first partitioned by a quadtree structure. The quadtree leaf nodes are further partitioned by a binary tree or ternary (or triple) tree structure. The partitioning tree leaf nodes are called coding units (CUs), and that segmentation is used for prediction and transform processing without any further partitioning. This means that the CU, PU and TU have the same block size in the QTBT coding block structure. In parallel, multiple partition, for example, triple tree partition may be used together with the QTBT block structure.

In one example, the mode selection unit 260 of video encoder 20 may be configured to perform any combination of the partitioning techniques described herein.

As described above, the video encoder 20 is configured to determine or select the best or an optimum prediction mode from a set of (e.g. pre-determined) prediction modes. The set of prediction modes may comprise, e.g., intra-prediction modes and/or inter-prediction modes.

Intra-Prediction

The set of intra-prediction modes may comprise 35 different intra-prediction modes, e.g. non-directional modes like DC (or mean) mode and planar mode, or directional modes, e.g. as defined in HEVC, or may comprise 67 different intra-prediction modes, e.g. non-directional modes like DC (or mean) mode and planar mode, or directional modes, e.g. as defined for VVC.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, skip mode and/or direct mode may be applied.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g. reconstructed blocks of one or a plurality of other/different previously decoded pictures 231, for motion estimation. E.g. a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g. receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

The motion compensation unit may also generate syntax elements associated with the blocks and video slices for use by video decoder 30 in decoding the picture blocks of the video slice.

In addition or as an alternative to slices and respective syntax elements, tile groups and/or tiles and respective syntax elements may be generated or used.

Entropy Coding

The entropy encoding unit 270 is configured to apply, for example, an entropy encoding algorithm or scheme (e.g. a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of this present application. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice (and/or tile groups or tiles) and associated syntax elements.

In the example of FIG. 3, the decoder 30 comprises an entropy decoding unit 304, an inverse quantization unit 310, an inverse transform processing unit 312, a reconstruction unit 314 (e.g. a summer 314), a loop filter 320, a decoded picture buffer (DBP) 330, a mode application unit 360, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214 the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g. any or all of inter prediction parameters (e.g. reference picture index and motion vector), intra prediction parameter (e.g. intra prediction mode or index), transform parameters, quantization parameters, loop filter parameters, and/or other syntax elements. Entropy decoding unit 304 maybe configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

Inverse Quantization

The inverse quantization unit 310 may be configured to receive quantization parameters (QP) (or in general information related to the inverse quantization) and quantized coefficients from the encoded picture data 21 (e.g. by parsing and/or decoding, e.g. by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice (or tile or tile group) to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

Reconstruction

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in decoded picture buffer 330, which stores the decoded pictures 331 as reference pictures for subsequent motion compensation for other pictures and/or for output respectively display.

The decoder 30 is configured to output the decoded picture 311, e.g. via output 312, for presentation or viewing to a user.

Prediction

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode application unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode application unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g. motion compensation unit) of mode application unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Mode application unit 360 is configured to determine the prediction information for a video block of the current video slice by parsing the motion vectors or related information and other syntax elements, and uses the prediction information to produce the prediction blocks for the current video block being decoded. For example, the mode application unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Embodiments of the video decoder 30 as shown in FIG. 3 may be configured to partition and/or decode the picture by using slices (also referred to as video slices), wherein a picture may be partitioned into or decoded using one or more slices (typically non-overlapping), and each slice may comprise one or more blocks (e.g. CTUs).

Embodiments of the video decoder 30 as shown in FIG. 3 may be configured to partition and/or decode the picture by using tile groups (also referred to as video tile groups) and/or tiles (also referred to as video tiles), wherein a picture may be partitioned into or decoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current operation may be further processed and then output to the next operation. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of current block (including but not limit to control point motion vectors of affine mode, sub-block motion vectors in affine, planar, ATMVP modes, temporal motion vectors, and so on). For example, the value of motion vector is constrained to a predefined range according to its representing bit. If the representing bit of motion vector is bitDepth, then the range is $-2^{(bitDepth-1)} \sim 2^{(bitDepth-1)}-1$, where "^" means exponentiation. For example, if bitDepth is set equal to 16, the range is $-32768 \sim 32767$; if bitDepth is set equal to 18, the range is $-131072 \sim 131071$. For example, the value of the derived motion vector (e.g. the MVs of four 4×4 sub-blocks within one 8×8 block) is constrained such that the max difference between integer parts of the four 4×4 sub-block MVs is no more than N pixels, such as no more than 1 pixel. Here provides two methods for constraining the motion vector according to the bitDepth are provided.

Method 1: Remove the Overflow MSB (Most Significant Bit) by Flowing Operations $$ux = (mvx + 2^{bitDepth}) \% 2^{bitDepth} \qquad (1)$$

$$mvx = (ux >= 2^{bitDepth-1})?(ux - 2^{bitDepth}):ux \qquad (2)$$

$$uy = (mvy + 2^{bitDepth}) \% 2^{bitDepth} \qquad (3)$$

$$mvy = (uy >= 2^{bitDepth-1})?(uy - 2^{bitDepth}):uy \qquad (4)$$

where mvx is a horizontal component of a motion vector of an image block or a sub-block, mvy is a vertical component of a motion vector of an image block or a sub-block, and ux and uy indicates an intermediate value;

For example, if the value of mvx is −32769, after applying formula (1) and (2), the resulting value is 32767. In computer system, decimal numbers are stored as two's complement. The two's complement of −32769 is 1,0111,1111, 1111,1111 (17 bits), then the MSB is discarded, so the resulting two's complement is 0111,1111,1111,1111 (decimal number is 32767), which is same as the output by applying formula (1) and (2).

$$ux = (mvpx + mvdx + 2^{bitDepth})\%2^{bitDepth} \qquad (5)$$

$$mvx = (ux >= 2^{bitDepth-1})?(ux - 2^{bitDepth}):ux = \qquad (6)$$

$$uy = (mvpy + mvdy + 2^{bitDepth})\%2^{bitDepth} \qquad (7)$$

$$mvy = (uy >= 2^{bitDepth-1})?(uy - 2^{bitDepth}):uy \qquad (8)$$

The operations may be applied during the sum of mvp and mvd, as shown in formula (5) to (8).

Method 2: Remove the Overflow MSB by Clipping the Value $$vx = \text{Clip3}(-2^{bitDepth-1}, 2^{bitDepth-1}-1, vx)$$

$$vy = \text{Clip3}(-2^{bitDepth-1}, 2^{bitDepth-1}-1, vy)$$

where vx is a horizontal component of a motion vector of an image block or a sub-block, vy is a vertical component of a motion vector of an image block or a sub-block; x, y and z respectively correspond to three input value of the MV clipping process, and the definition of function Clip3 is as follow:

$$\text{Clip3}(x, y, z) = \begin{cases} x; & z < x \\ y; & z > y \\ z; & \text{otherwise} \end{cases}$$

Figure 4:
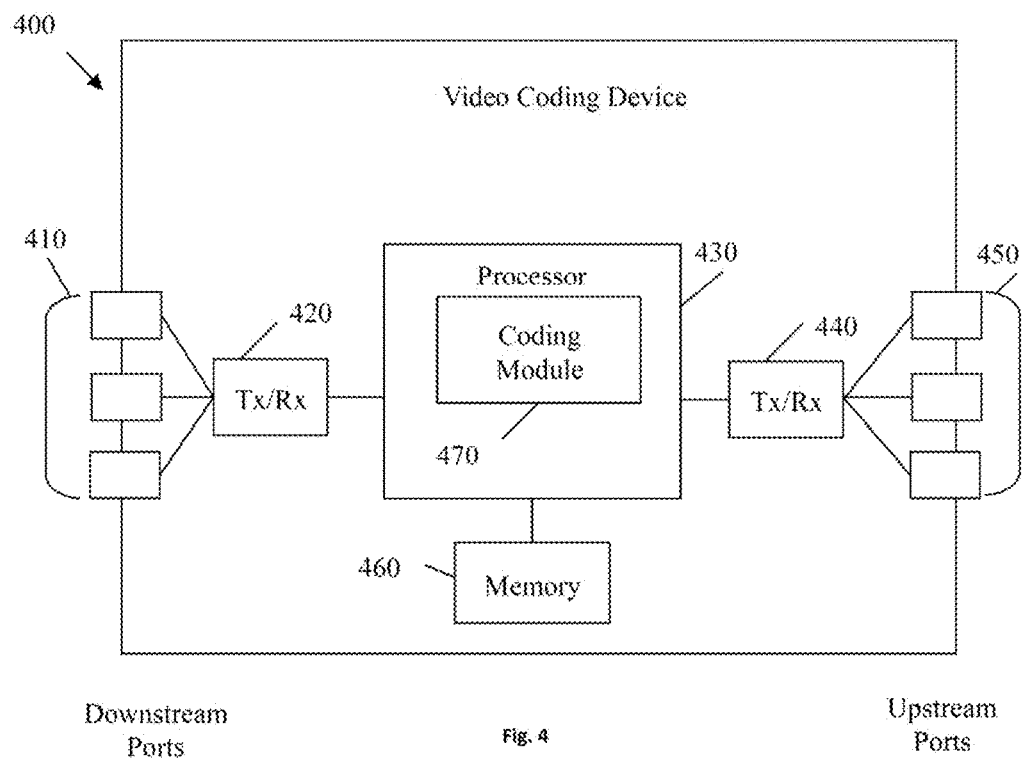
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
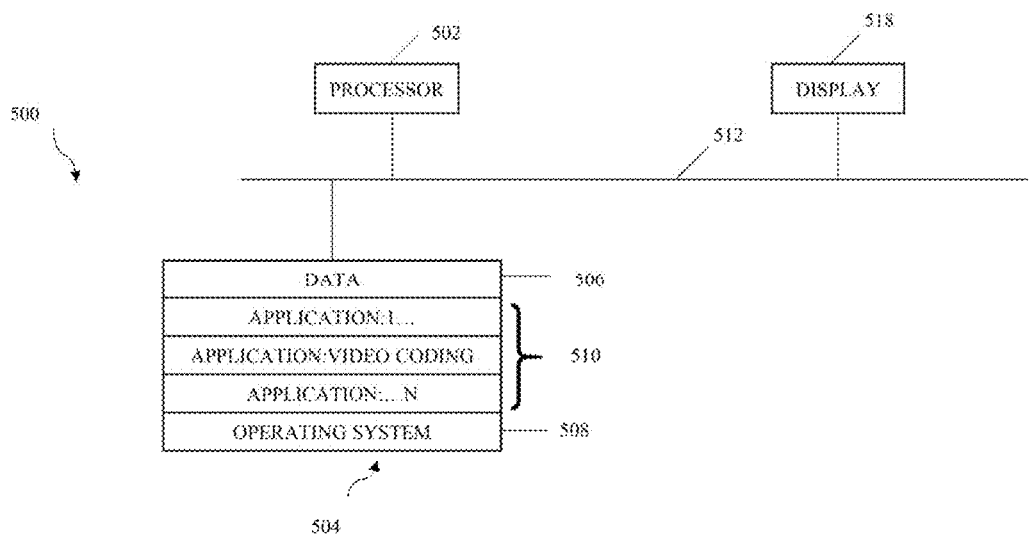
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1 according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

Inter prediction may comprises decoder motion vector refinement based inter bi-prediction, or bi-directional optical flow inter prediction. The following is the introduction of decoder motion vector refinement based inter bi-prediction, or bi-directional optical flow inter prediction.

Motion Vector Refinement (MVR), or Referred to as Decoder Side Motion Vector Refinement (DMVR)

Motion vectors are usually at least partially determined at the encoder side and signaled to the decoder within the coded bitstream. However, the motion vectors may also be refined at the decoder (and also at the encoder) starting from initial motion vectors indicated in the bitstream. In such case, for instance, similarity between the patches of already decoded pixels pointed by the initial motion vectors may be used to improve the accuracy of the initial motion vectors. Such motion refinement provides an advantage of reducing the signaling overhead: the accuracy of the initial motion is improved in the same way at both the encoder and the decoder and thus, no additional signaling for the refinement is needed.

It is noted that the initial motion vectors before refinement might not be the best motion vectors that result in the best prediction. Since the initial motion vectors are signaled in the bitstream, it might not be possible to represent the initial motion vector with very high accuracy (which would increase the bitrate), therefore the motion vector refinement process is utilized to improve the initial motion vector. Initial motion vectors might, for instance, be the motion vectors that are used in the prediction of a neighbor block of a current block. In this case it is enough to signal an indication in the bitstream, indicating motion vectors of which neighbor block is used by the current block. Such a prediction mechanism is very efficient in reducing the number of bits to represent the initial motion vectors. However the accuracy of the initial motion vectors might be low, since in general the motion vectors of two neighboring blocks are not expected to be identical.

In order to further improve the accuracy of motion vectors without further increase in signaling overhead, it may be beneficial to further refine the motion vectors derived at the encoder side and provided (signaled) in the bitstream. The motion vector refinement may be performed at the decoder without assistance from the encoder. The encoder in its decoder loop may employ the same refinement to obtain corresponding refined motion vectors as would be available at the decoder. The refinement for a current block that is being reconstructed in a current picture is performed by determining a template of reconstructed samples, determining a search space around the initial motion information for the current block and finding in the search space a reference picture portion best matching the template. The best matching portion determines the refined motion vectors for the current block which is then used to obtain the Inter-predicted samples for the current block, i.e. the current block being reconstructed.

Motion vector refinement is a part of Inter Prediction Unit (244) in FIGS. 2 and 344 in FIG. 3.

The motion vector refinement may be performed according to the following operations:

Typically, an initial motion vectors can be determined based on an indication in the bitstream. For example, an index might be signaled in the bitstream which indicates a position in a list of candidate motion vectors. In another example, a motion vector predictor index and motion vector difference value can be signaled in the bitstream. Motion vectors that are determined based on an indication in the bitstream are defined to be initial motion vectors. In the case of bi-prediction, where the inter-prediction for the current block is obtained as a weighted combination of the predicted block of samples which are determined according to two motion vectors, let the initial motion vector in a first reference picture in list L0 be denoted as MV0; and the initial motion vector in the second reference picture in list L1 be denoted as MV1.

Using the initial motion vectors, refinement candidate motion vector (MV) pairs are determined. At least, two refinement candidate pairs need to be determined. Typically, the refinement candidate motion vector pairs are determined based on the initial motion vector pair (MV0, MV1). Furthermore, the candidate MV pairs are determined by adding small motion vector differences to MV0 and MV1. For example, the candidate MV pairs might include the following:

(MV0, MV1)
(MV0+(0,1), MV1+(0,-1))
(MV0+(1,0), MV1+(-1,0))
(MV0+(0,-1), MV1+(0,1))
(MV0+(-1,0), MV1+(1,0))
. . .

Where (1,-1) denotes a vector that has a displacement of 1 in the horizontal (or x) direction and a displacement of -1 in the vertical (or y) direction.

It is noted that the above list of candidate pairs are just examples for explanation and the disclosure is not limited to a specific list of candidates.

Refinement candidate motion vector (MV) pairs form the search space of the motion vector refinement process.

In a bi-prediction of current block, two prediction blocks obtained using the respective first motion vector of list L0 and the second motion vector of list L1, are combined to a single prediction signal, which can provide a better adaptation to the original signal than uni-prediction, resulting in less residual information and possibly a more efficient compression.

In motion vector refinement, the two prediction blocks obtained using the respective first motion vector and the second motion vector of a candidate MV pair are compared based on a similarity metric for each of the refinement candidate MV pairs. A candidate MV pair resulting in the highest similarity is usually selected as the refined motion vectors. Denoted as MV0' and MV1', refined motion vector in a first reference picture in list L0 and refined motion vector in a second reference picture in list L1 respectively. In other words, predictions are obtained corresponding to list L0 motion vector and list L1 motion vector of the candidate motion vector pair, which are then compared based on a similarity metric. The candidate motion vector pair that has the highest associated similarity is selected as refined MV pair.

Typically the output of the refinement process are refined MVs. The refined MVs might be same as the initial MVs or might be different from the initial MVs, depending on which candidate MV pair achieves the highest similarity, the candidate MV pair formed by initial MVs are also among the MV pair candidates. In other words, if the highest candidate MV pair that achieves the highest similarity is formed by the initial MVs, the refined MVs and initial MVs are equal to each other.

Instead of selecting the position that maximizes a similarity metric, another method is select a position that minimizes a dis-similarity metric. The dis-similarity comparison measure might be SAD (Sum of absolute differences), MRSAD (mean removed sum of absolute differences, SSE (Sum of Squared Error) etc. The SAD between two prediction blocks may be obtained using a candidate MV pair (CMV0, CMV1), the SAD can be computed as follows:

$$SAD(CMV0, CMV1) = \sum_{x=0}^{nCbW-1} \sum_{y=0}^{nCbH-1} abs(predSamplesL0[x][y] - predSamplesL1[x][y])$$

where nCbH and nCbW are height and the width of the prediction blocks, the function abs(a) specifies the absolute value of the argument a, predSAmplesL0 and predSAmplesL1 are prediction block samples obtained according to candidate MV pair which is denoted by (CMV0, CMV1).

Alternatively, the dis-similarity comparison measures can be obtained by evaluating only a subset of samples in a prediction block, in order to reduce the number of computations. An example is below, where rows of samples are alternatively included in the SAD calculation (every second row is evaluated).

$$SAD(CMV0, CMV1) = \sum_{x=0}^{nCbW-1} \sum_{y=0}^{nCbH/2-1} abs(predSamplesL0[x][2*y] - predSamplesL1[x][2*y])$$

One example of motion vector refinement is explained in the document JVET-M1001-v3, "Versatile Video Coding (Draft 4)" of JVET (of ITU-T SG 16 WP 3 and ISO/IEC JTC 1/SC 29/WG 11) which is publicly available under http://phenix.it-sudparis.eu/jvet/". The section "8.4.3 Decoder side motion vector refinement process" in the document exemplifies the motion vector refinement.

In order to reduce internal memory requirements for refinement, in some embodiments, the motion vector refinement process may be performed independently on blocks of luma samples obtained by partitioning coded block of samples that exceed a certain pre-determined width or pre-determined height in luma samples into sub-blocks of samples that are less than or equal to the pre-determined width and pre-determined height in luma. The refined MV pair for each sub-block within a partitioned coded block can be different. Inter-prediction for both luma and chroma are then performed for each sub-block using the refined MV pair of that sub-block.

Each MV of the initial MV pair can have a fractional pixel precision. In other words, the MV indicates a displacement between a current block of samples and a re-sampled reference region and this displacement can point to a fractional position in the horizontal and vertical directions from the integer grid of reconstructed reference samples. Typically, a 2-dimensional interpolation of the reconstructed reference integer sample grid values is performed to obtain the sample values at the fractional sample offset location. The process of obtaining predicted samples from the reconstructed reference pictures using a candidate MV pair can be through one of the following methods:

Round the fractional part of the initial MV pair to the nearest integer location and obtain the integer grid values of the reconstructed reference pictures.

Perform a 2-tap (e.g. bilinear) separable bilinear interpolation to obtain the predicted sample values at the fractional pixel accuracy indicated by the initial MV pair.

Perform a higher tap (e.g. 8-tap or 6-tap) separable interpolation to obtain the predicted sample values at the fractional pixel accuracy indicated by the initial MV pair.

While the candidate MV pairs can have arbitrary sub-pixel offset with respect to the initial MV pair, in some embodiments, for the sake of simplicity of search, the candidate MV pairs are chosen with integer pixel distance with respect to the initial MV pair. In such cases, the predicted samples across all the candidate MV pair can be obtained by performing a prediction for a block of samples around the initial MV pair to cover all the refinement positions around the initial MV pair.

In some embodiments, once the dis-similarity cost value at all the candidate MV pairs at an integer distance from the initial MV pair have been evaluated, additional candidate MV pairs at sub-pixel distance offsets from the best cost value position are added. Predicted samples are obtained for each of these positions using one of the methods described earlier and the dis-similarity costs are evaluated and compared to obtain the lowest dis-similarity position. In certain other embodiments, to avoid this computationally expensive prediction process for each sub-pixel distance position around the best cost integer-distance position, the integer-distance cost values evaluated are remembered and a parametric error surface is fitted in the vicinity of the best integer-distance position. The minimum of this error surface is then analytically computed and used as the position with the minimum dis-similarity. In such cases, the dis-similarity cost value is said to be derived from the computed integer-distance cost values.

The application of motion vector refinement for a given coded block of samples can be conditioned on certain coding properties of the coded block of samples. Some examples of such coding properties can be:

The distance in number of pictures (when sampled at a uniform frame-rate) from the current picture to the two reference pictures used for bi-prediction of the coded block of samples are equal and fall on opposite sides of the current picture.

The initial dis-similarity between the two predicted blocks obtained using the initial MV pair is less than a pre-determined per-sample threshold.
Bi-Predictive Optical Flow Refinement (BPOF) or Referred to as Bi-Directional Optical Flow (BDOF)

Bi-directional optical flow is a process of improving the accuracy of bi-prediction of a block, without explicitly additional signaling in the bitstream other than signaled for bi-prediction. It is a part of Inter Prediction Unit (244) in FIGS. 2 and 344 in FIG. 3.

In bi-prediction, 2 inter-predictions are obtained according to two motion vectors, then the predictions are combined by application of weighted averaging. The combined prediction can result in a reduced residual energy as the quantization noise in the two reference patches get canceled out, thereby providing more coding efficiency than uni-prediction. Weighted combination in bi-prediction can be performed by an equation:

$$Bi\text{-}prediction = Prediction1*W1 + Prediction2*W2 + K,$$

where W1 and W2 are weighting factors that might be signaled in a bitstream or might be predefined in encoder side or in decoder side. K is an additive factor which might also be signaled in a bitstream or be predefined in encoder side or in decoder side. As an example, bi-prediction might be obtained using $$Bi\text{-}prediction = (Prediction1 + Prediction2)/2,$$

where W1 and W2 are set to ½ and K is set to 0.

The goal of optical flow refinement is to improve the accuracy of the bi-prediction. Optical flow is the pattern of apparent motion of image objects between two consecutive frames, Optical flow is caused by the movement of object or camera. Optical flow refinement process improves the accuracy of the bi-prediction by application of optical flow equation (solving of optical flow equation).

In an example, a pixel I(x,y,t) is located in a first frame (x and y corresponding to spatial coordinates, t corresponding to time dimension). The object represented by the pixel moves by distance (dx,dy) in next frame taken after dt time. Since those pixels are the same and intensity does not change, the optical flow equation is given by:

$$I(x,y,t) = I(x+dx, y+dy, t+dt)$$

I(x,y,t) specifies the intensity (sample value) of a pixel at the coordinates of (x,y,t).

In another example, small displacements and higher order terms in a Taylor series expansion are ignored, the optical flow equations can also be written as:

$$\frac{\partial I}{\partial t} + v_x \frac{\partial I}{\partial x} + v_y \frac{\partial I}{\partial y} = 0$$

Where $$\frac{\partial I}{\partial x} \text{ and } \frac{\partial I}{\partial y}$$

are the horizontal and vertical spatial sample gradients at position (x,y) and $$\frac{\partial I}{\partial t}$$

is the partial temporal derivative at (x,y).

The optical flow refinement utilizes the principle above in order to improve the quality of bi-prediction.

The implementation of optical flow refinement typically includes the operations of:
1. Calculating sample gradients;
2. Calculating difference between first prediction and second prediction;
3. Calculating displacement of pixels or group of pixels that minimizes the error Δ between the two reference patches obtained using the optical flow equation.

$$\Delta = (I^{(0)} - I^{(1)}) + v_x \left( \tau_0 \frac{\partial I^{(0)}}{\partial x} + \tau_1 \frac{\partial I^{(1)}}{\partial x} \right) + v_y \left( \tau_0 \frac{\partial I^{(0)}}{\partial y} + \tau_1 \frac{\partial I^{(1)}}{\partial y} \right)$$

where $I^{(0)}$ corresponds to sample value in first prediction, $I^{(1)}$ is the sample value in second prediction, and $\partial I^{(0)}/\partial x$ and $\partial I^{(0)}/\partial y$ are the gradients in -x and -y directions. $\tau_1$ and $\tau_0$ denote the distances to the reference pictures, where the first predition and second prediction are obtained. The motion vector field $(v_x, v_y)$ is obtained by the minimizing process. Some approaches minimize the sum of squared errors while some approaches minimize the sum of absolute error.

4. Employing an implementation of the optical flow equation, such as below:

$$pred_{BIO} = \frac{1}{2} \cdot (I^{(0)} + I^{(1)} + v_x/2 \cdot (\tau_1 \partial I^{(1)}/\partial x - \tau_0 \partial I^{(0)}/\partial x) + v_y/2 \cdot (\tau_1 \partial I^{(1)}/\partial y - \tau_0 \partial I^{(0)}/\partial y))$$

Where $pred_{BIO}$ specifies the modified prediction which is the output of the optical flow refinement process.

Sample gradients can be obtained by the following formula $$\partial I(x,y,t)/\partial x = I(x+1,y,t) - I(x-1,y,t)$$

$$\partial I(x,y,t)/\partial y = I(x,y+1,t) - I(x,y-1,t)$$

In some embodiments, in order to simplify the complexity of estimating the displacement for each pixel, the displacement is estimated for a group of pixels. In some examples, to compute the improved bi-prediction for a block of 4×4 luma samples, the displacements are estimated using sample values of a block of 8×8 luma samples with the 4×4 block of samples at its center.

The input of optical flow refinement process are the prediction samples from two reference pictures and the output of the optical flow refinement is combined prediction (predBIO) which is calculated according to optical flow equation.

One example of optical flow refinement is explained in the 8.4.7.4 "Bidirectional optical flow prediction process" section of the document JVET-M1001, Versatile Video Coding (Draft 4).

The terms optical flow, bi-predictive optical flow and bi-directional optical flow refinement are used interchangeably in the disclosure, as the terms are equivalent in nature.

Bi-Directional Optical Flow (BDOF)

The bi-directional optical flow (BDOF) tool is included in VVC. BDOF, previously referred to as BIO, was included in the JEM. Compared to the JEM version, the BDOF in VVC is a simpler version that requires much less computation, especially in terms of number of multiplications and the size of the multiplier.

BDOF is used to refine the bi-prediction signal of a CU at the 4×4 sub-block level. BDOF is applied to a CU if it satisfies the following conditions: 1) the CU's height is not 4, and the CU is not in size of 4×8, 2) the CU is not coded using affine mode or the ATMVP merge mode; 3) the CU is coded using "true" bi-prediction mode, i.e., one of the two reference pictures is prior to the current picture in display order and the other is after the current picture in display order. BDOF is only applied to the luma component.

BDOF is used to refine the bi-prediction signal of a CU at the 4×4 subblock level. BDOF is applied to a CU if it satisfies all the following conditions:

The CU is coded using "true" bi-prediction mode, i.e., one of the two reference pictures is prior to the current picture in display order and the other is after the current picture in display order The distances (i.e. POC difference) from two reference pictures to the current picture are same Both reference pictures are short-term reference pictures.

The CU is not coded using affine mode or the ATMVP merge mode

CU has more than 64 luma samples

Both CU height and CU width are larger than or equal to 8 luma samples

BCW weight index indicates equal weight

WP is not enabled for the current CU

CIIP mode is not used for the current CU

BDOF is only applied to the luma component. As its name indicates, the BDOF mode is based on the optical flow concept, which assumes that the motion of an object is smooth. For each 4×4 sub-block, a motion refinement $(v_x, v_y)$ is calculated by minimizing the difference between the L0 and L1 prediction samples. The motion refinement is then used to adjust the bi-predicted sample values in the 4×4 sub-block. The following operations are applied in the BDOF process.

First, the horizontal and vertical gradients, $$\frac{\partial I^{(k)}}{\partial x}(i,j) \text{ and } \frac{\partial I^{(k)}}{\partial y}(i,j),$$

k=0,1, of the two prediction signals are computed by directly calculating the difference between two neighboring samples, i.e., $$\frac{\partial I^{(k)}}{\partial x}(i,j) = (I^{(k)}(i+1,j) - I^{(k)}(i-1,j)) \gg shift1 \quad (3-1)$$

$$\frac{\partial I^{(k)}}{\partial y}(i,j) = (I^{(k)}(i,j+1) - I^{(k)}(i,j-1)) \gg shift1$$

where $I^{(k)}(i,j)$ are the sample value at coordinate (i,j) of the prediction signal in list k, k=0, 1, and shift1 is calculated based on the luma bit depth, bitDepth, as shift1=max(6, bitDepth−6).

Then, the auto- and cross-correlation of the gradients, $S_1$, $S_2$, $S_3$, $S_5$ and $S_6$, are calculated as $$S_1 = \sum_{(i,j)\in\Omega} \psi_x(i,j) \cdot \psi_x(i,j), \quad (3-2)$$

$$S_3 = \sum_{(i,j)\in\Omega} \theta(i,j) \cdot \psi_x(i,j)$$

$$S_2 = \sum_{(i,j)\in\Omega} \psi_x(i,j) \cdot \psi_y(i,j)$$

$$S_5 = \sum_{(i,j)\in\Omega} \psi_y(i,j) \cdot \psi_y(i,j)$$

$$S_6 = \sum_{(i,j)\in\Omega} \theta(i,j) \cdot \psi_y(i,j)$$

where $$\psi_x(i,j) = \left(\frac{\partial I^{(1)}}{\partial x}(i,j) + \frac{\partial I^{(0)}}{\partial x}(i,j)\right) \gg n_a \quad (3-3)$$

$$\psi_y(i,j) = \left(\frac{\partial I^{(1)}}{\partial y}(i,j) + \frac{\partial I^{(0)}}{\partial y}(i,j)\right) \gg n_a$$

$$\theta(i,j) = (I^{(1)}(i,j) \gg n_b) - (I^{(0)}(i,j) \gg n_b)$$

where $\Omega$ is a 6×6 window around the 4×4 sub-block, and the values of $n_a$ and $n_b$ are set equal to min(1, bitDepth−11) and min(4, bitDepth−8), respectively.

The motion refinement ($v_x$, $v_y$) is then derived using the cross- and auto-correlation terms using the following:

$$v_x = S_1 > 0 ? clip3(-th'_{BIO}, th'_{BIO}, -((S_3 \cdot 2^{n_b-n_a}) \gg \lfloor \log_2 S_1 \rfloor)) : 0 \quad (3-4)$$

$$v_y = S_5 > 0 ? clip3(-th'_{BIO}, th'_{BIO}, -((S_6 \cdot 2^{n_b-n_a} - ((v_x S_{2,m} \ll n_{S_2} + v_x S_{2,s})/2)) \gg \lfloor \log_2 S_5 \rfloor)) : 0$$

where $$S_{2,m} = S_2 \gg n_{S_2}, S_{2,s} = S_2 \& (2^{n_{S_2}} - 1), th'_{BIO} = 2^{max(5,BD-7)}.$$

$\lfloor \cdot \rfloor$ is the floor function, and $n_{S_2} = 12$.

Based on the motion refinement and the gradients, the following adjustment is calculated for each sample in the 4×4 sub-block:

$$b(x,y) = rnd\left(\left(v_x\left(\frac{\partial I^{(1)}(x,y)}{\partial x} - \frac{\partial I^{(0)}(x,y)}{\partial x}\right)\right)/2\right) + \quad (3-5)$$

$$rnd\left(\left(v_y\left(\frac{\partial I^{(1)}(x,y)}{\partial y} - \frac{\partial I^{(0)}(x,y)}{\partial y}\right)\right)/2\right)$$

Finally, the BDOF samples of the CU are calculated by adjusting the bi-prediction samples as follows:

$$pred_{BDOF}(x,y) = (I^{(0)}(x,y) + I^{(1)}(x,y) + b(x,y) + o_{offset}) \gg shift \quad (3-5)$$

These values are selected such that the multipliers in the BDOF process do not exceed 15-bit, and the maximum bit-width of the intermediate parameters in the BDOF process is kept within 32-bit.

Figure 6:
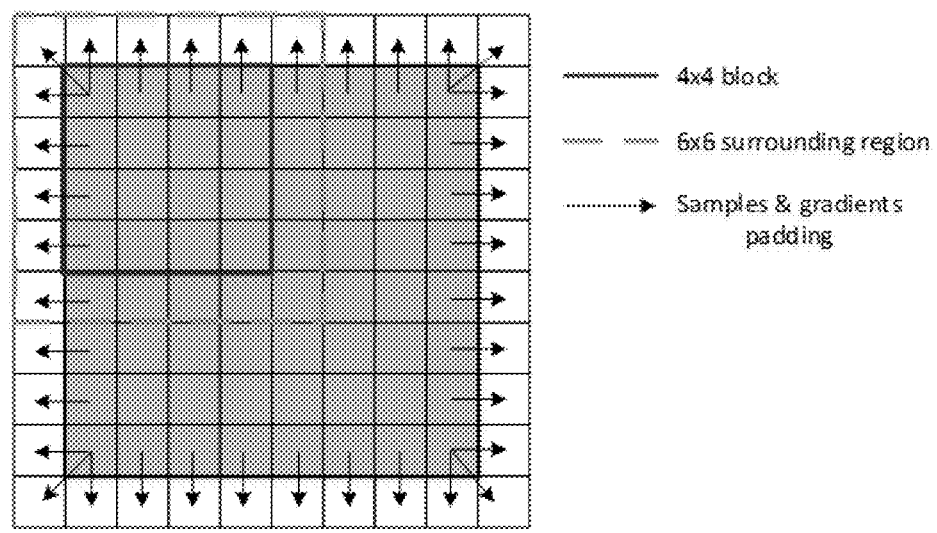
FIG. 6 illustrates an extended CU region used in BDOF.

In order to derive the gradient values, some prediction samples $I^{(k)}(i,j)$ in list k (k=0,1) outside of the current CU boundaries need to be generated. As depicted in FIG. 6, the BDOF in VTM5 uses one extended row/column around the CU's boundaries. In order to control the computational complexity of generating the out-of-boundary prediction samples, prediction samples in the extended area (white positions) are generated by taking the reference samples at the nearby integer positions (using floor( ) operation on the coordinates) directly without interpolation, and the normal 8-tap motion compensation interpolation filter is used to generate prediction samples within the CU (gray positions). These extended sample values are used in gradient calculation only. For the remaining operations in the BDOF process, if any sample and gradient values outside of the CU boundaries are needed, they are padded (i.e. repeated) from their nearest neighbors.

When the width and/or height of a CU are larger than 16 luma samples, it will be split into sub-blocks with width and/or height equal to 16 luma samples, and the sub-block boundaries are treated as the CU boundaries in the BDOF process. The maximum unit size for BDOF process is limit to 16×16.

For each subblock, the BDOF process could skipped. When the SAD of between the initial L0 and L1 prediction samples is smaller than a threshold, the BDOF process is not applied to the subblock. The threshold is set equal to (8*W*(H>>1)), where W indicates the subblock width, and H indicates subblock height. To avoid the additional complexity of SAD calculation, the SAD between the initial L0 and L1 prediction samples calculated in DVMR process is re-used here.

If BCW is enabled for the current block, i.e., the BCW weight index indicates unequal weight, then bi-directional optical flow is disabled. Similarly, if WP is enabled for the current block, i.e., the luma_weight_lx_flag is 1 for either of the two reference pictures, then BDOF is also disabled. When a CU is coded with symmetric MVD mode, BDOF is also disabled.

Decoder Side Motion Vector Refinement (DMVR)

Figure 7:
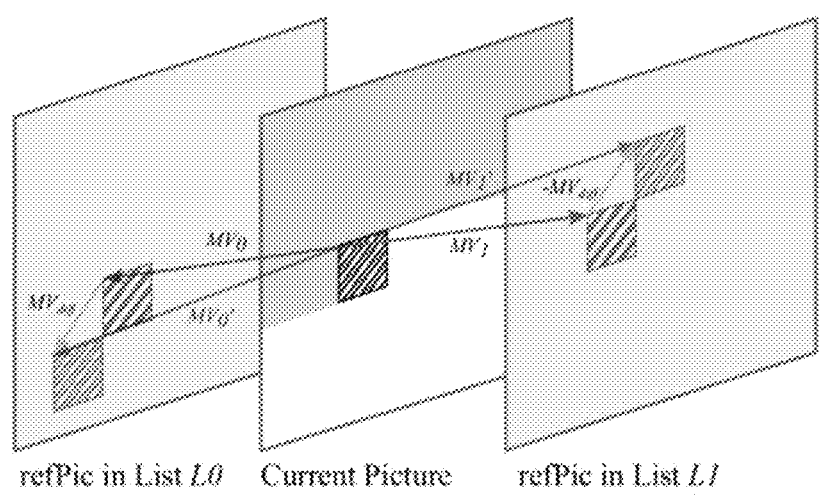
FIG. 7 illustrates Decoder Side Motion Vector Refinemen.

In order to increase the accuracy of the MVs of the merge mode, a bilateral-matching based decoder side motion vector refinement is applied in VVC. In bi-prediction operation, a refined MV is searched around the initial MVs in the reference picture list L0 and reference picture list L1. The BM method calculates the distortion between the two candidate blocks in the reference picture list L0 and list L1. As illustrated in FIG. 7, the SAD between the red blocks based on each MV candidate around the initial MV is calculated. The MV candidate with the lowest SAD becomes the refined MV and used to generate the bi-predicted signal. In VVC, the DMVR can be applied for the CUs which are coded with following modes and features:

CU level merge mode with bi-prediction MV

One reference picture is in the past and another reference picture is in the future with respect to the current picture The distances (i.e. POC difference) from two reference pictures to the current picture are same Both reference pictures are short-term reference pictures CU has more than 64 luma samples Both CU height and CU width are larger than or equal to 8 luma samples BCW weight index indicates equal weight
WP is not enabled for the current block
CIIP mode is not used for the current block
The refined MV derived by DMVR process is used to generate the inter prediction samples and also used in temporal motion vector prediction for future pictures coding. While the original MV is used in deblocking process and also used in spatial motion vector prediction for future CU coding.

The additional features of DMVR are mentioned in the following sub-clauses.

In VTM5, the DMVR can be applied for the CUs which are coded with following modes and features:
CU level merge mode with bi-prediction MV
One reference picture is in the past and another reference picture is in the future with respect to the current picture
The distances (i.e. POC difference) from both reference pictures to the current picture are same
CU has more than 64 luma samples
Both CU height and CU width are larger than or equal to 8 luma samples
BCW weight index indicates equal weight
WP is not enabled for the current block Searching Scheme In DVMR, the search points are surrounding the initial MV and the MV offset obey the MV difference mirroring rule. In other words, any points that are checked by DMVR, denoted by candidate MV pair (MV0, MV1) obey the following two equations:

$$MV0'=MV0+MV\_\text{offset} \quad (3\text{-}6)$$

$$MV1'=MV1-MV\_\text{offset} \quad (3\text{-}7)$$

Where MV_offset represents the refinement offset between the initial MV and the refined MV in one of the reference pictures. The refinement search range is two integer luma samples from the initial MV. The searching includes the integer sample offset search stage and fractional sample refinement stage.

25 points full search is applied for integer sample offset searching. The SAD of the initial MV pair is first calculated. If the SAD of the initial MV pair is smaller than a threshold, the integer sample stage of DMVR is terminated. Otherwise SADs of the remaining 24 points are calculated and checked in raster scanning order. The point with the smallest SAD is selected as the output of integer sample offset searching stage. To reduce the penalty of the uncertainty of DMVR refinement, it is proposed to favor the original MV during the DMVR process. The SAD between the reference blocks referred by the initial MV candidates is decreased by ¼ of the SAD value.

The integer sample search is followed by fractional sample refinement. To save the calculational complexity, the fractional sample refinement is derived by using parametric error surface equation, instead of additional search with SAD comparison. The fractional sample refinement is conditionally invoked based on the output of the integer sample search stage. When the integer sample search stage is terminated with center having the smallest SAD in either the first iteration or the second iteration search, the fractional sample refinement is further applied.

In parametric error surface based sub-pixel offsets estimation, the center position cost and the costs at four neighboring positions from the center are used to fit a 2-D parabolic error surface equation of the following form $$E(x,y)=A(x-x_{min})^2+B(y-y_{min})^2+C \quad (3\text{-}8)$$

where $(x_{min}, y_{min})$ corresponds to the fractional position with the least cost and C corresponds to the minimum cost value. By solving the above equations by using the cost value of the five search points, the $(x_{min}, y_{min})$ is computed as:

$$x_{min}=(E(-1,0)-E(1,0))/(2(E(-1,0)+E(1,0)-2E(0,0))) \quad (3\text{-}9)$$

$$y_{min}=(E(0,-1)-E(0,1))/(2((E(0,-1)+E(0,1)-2E(0,0))) \quad (3\text{-}10)$$

The value of $x_{min}$ and $y_{min}$ are automatically constrained to be between −8 and 8 since all cost values are positive and the smallest value is E(0,0). This corresponds to half peal offset with 1/16th-pel MV accuracy in VVC. The computed fractional $(x_{min}, y_{min})$ are added to the integer distance refinement MV to get the sub-pixel accurate refinement delta MV.

Bilinear-Interpolation and Sample Padding

In VVC, the resolution of the MVs is 1/16 luma samples. The samples at the fractional position are interpolated using a 8-tap interpolation filter. In DMVR, the search points are surrounding the initial fractional-pel MV with integer sample offset, therefore the samples of those fractional position need to be interpolated for DMVR search process. To reduce the calculation complexity, the bi-linear interpolation filter is used to generate the fractional samples for the searching process in DMVR. Another important effect is that by using bi-linear filter is that with 2-sample search range, the DVMR does not access more reference samples compared to the normal motion compensation process. After the refined MV is attained with DMVR search process, the normal 8-tap interpolation filter is applied to generate the final prediction. In order to not access more reference samples to normal MC process, the samples, which is not needed for the interpolation process based on the original MV but is needed for the interpolation process based on the refined MV, will be padded from those available samples.

Maximum DMVR Processing Unit

When the width and/or height of a CU are larger than 16 luma samples, it will be further split into subblocks with width and/or height equal to 16 luma samples. The maximum unit size for DMVR searching process is limit to 16×16.

Both DMVR and BDOF are coding tools that do not have a coding unit level flag to explicitly enable or disable them. A set of enabling conditions (such as whether the coding unit is a merge mode CU, dimensions of the coding unit, whether the coding unit is bi-predicted, whether the picture order count difference between the current frame and the two references are equal and opposite, etc.) are used to enable the application of DMVR and BDOF. Since the construction of merge list and verifying these conditions are not possible at parsing time, signaling of an enabling/disabling flag after evaluation of these conditions is not possible.

Both DMVR and BDOF have an implicit assumption that the motion vector delta in the case of DMVR and the optical flow in the case of BDOF are equal and opposite between the current frame and the two references on either sides of the current frame. This assumption may not be true in certain cases. For example, whenever the motion trajectory is not linear, or when two scenes are blended each with its own motion model, or in a synthetic scene with a non-linear transition, the assumptions may fail. In such cases, forcefully performing DMVR or BDOF can lead to coding loss when compared to not performing them.

Though there are flags for enabling DMVR or BDOF at the sequence parameter set (SPS) level, a sequence with very different content types and editing effects and overlays can benefit from DMVR and BDOF in many portions and hence disabling at the sequence level just because of some scenes in the sequence will not provide the coding gains possible with DMVR and BDOF.

Proposed Disclosure

In this disclosure, a flag is proposed at a finer granularity than the sequence parameter set to conditionally disable MVR when MVR is enabled at a higher granularity (e.g. at the SPS level for PPS, at the SPS/PPS level for a slice, etc.). Similarly, the disclosure proposes a flag at a finer granularity than the sequence parameter set to conditionally disable BDOF when BDOF is enabled at a higher granularity.

Multiple non-normative techniques can be used on the encoding side to detect the failure of the assumptions behind DMVR or BDOF, and accordingly set the proposed flag at the finer granularity level. In this disclosure, certain specific non-normative techniques are proposed that can be used to set the flag to disable DMVR or BDOF.

- sequence parameter set (SPS): A syntax structure containing syntax elements that apply to zero or more entire CLVSs as determined by the content of a syntax element found in the PPS referred to by a syntax element found in each picture header.
- slice header: A part of a coded slice containing the data elements pertaining to all tiles or CTU rows within a tile represented in the slice.
- syntax element: An element of data represented in the bitstream.
- syntax structure: Zero or more syntax elements present together in the bitstream in a specified order.
- picture header (PH): A syntax structure containing syntax elements that apply to all slices of a coded picture.
- picture parameter set (PPS): A syntax structure containing syntax elements that apply to zero or more entire coded pictures as determined by a syntax element found in each picture header.
- coded layer video sequence (CLVS): A sequence of PUs with the same value of nuh_layer_id that consists, in decoding order, of a CLVSS PU, followed by zero or more PUs that are not CLVSS PUs, including all subsequent PUs up to but not including any subsequent PU that is a CLVSS PU.
- coded layer video sequence start (CLVSS) PU: A PU in which the coded picture is a CLVSS picture.
- picture unit (PU): A set of NAL units that are associated with each other according to a specified classification rule, are consecutive in decoding order, and contain exactly one coded picture.

Embodiment-1

In this embodiment, a picture parameter set (PPS) level flag, pps_disable_dmvr_flag, is proposed to disable MVR whenever MVR is enabled at the SPS level (i.e. sps_dmvr_enabled_flag is set to 1 at the SPS level).

The syntax element is coded in the PPS as follows:
if (sps_dmvr_enabled_flag)
  pps_disable_dmvr_flag
It is encoded as a 1-bit flag in the bitstream.
The semantics of the pps_disable_dmvr_flag is as follows:
When pps_disable_dmvr_flag is decoded as 1 in a picture parameter set with id pps_picture_parameter_set_id, slices that use the pps_picture_parameter_set_id will disable MVR (i.e. decoder-side motion vector refinement shall not be performed for a regular merge mode coding unit). When sps_dmvr_enabled_flag is 1 and pps_disable_dmvr_flag is decoded as 0, slices that use pps_picture_parameter_set_id will enable MVR (i.e. decoder-side motion vector refinement shall be performed for sub-blocks of a regular merge mode coding unit).

Similarly, a picture parameter set (PPS) level flag, pps_disable_bdof_flag, is proposed to disable BDOF whenever BDOF is enabled at the SPS level (i.e. sps_bdof_enabled_flag is set to 1 at the SPS level).

The syntax element is coded in the PPS as follows:
if (sps_bdof_enabled_flag)
  pps_disable_bdof_flag
It is encoded as a 1-bit flag in the bitstream.
The semantics of the pps_disable_bdof_flag is as follows:
When pps_disable_bdof_flag is decoded as 1 in a picture parameter set with id pps_picture_parameter_set_id, slices that use the pps_picture_parameter_set_id will disable BDOF (i.e. bi-directional optical flow inter prediction shall not be performed for a regular merge mode coding unit). When sps_bdof_enabled_flag is 1 and pps_disable_bdof_flag is decoded as 0, slices that use pps_picture_parameter_set_id will enable BDOF (i.e. bi-directional optical flow inter prediction shall be performed for sub-blocks of a regular merge mode coding unit).

Embodiment-2

In this embodiment, a slice header level flag, slice_disable_dmvr_flag, is proposed to disable MVR whenever MVR is enabled at the SPS (i.e. sps_dmvr_enabled_flag is set to 1 at the SPS level).

The syntax element is coded in the slice header as follows:
if (sps_dmvr_enabled_flag)
  slice_disable_dmvr_flag
It is encoded as a 1-bit flag in the bitstream.
The semantics of the slice_disable_dmvr_flag is as follows:
When slice_disable_dmvr_flag is decoded as 1 in a slice header, where the slice contains a group of tiles or a group of CTU rows within a tile, the coding units within the slice will disable MVR (i.e. decoder-side motion vector refinement shall not be performed for a regular merge mode coding unit). When sps_dmvr_enabled_flag is 1 and slice_disable_dmvr_flag is decoded as 0, the coding units within the slice will enable MVR (i.e. decoder-side motion vector refinement shall be performed for sub-blocks of a regular merge mode coding unit).

Similarly, a slice level flag, slice_disable_bdof_flag is proposed to disable BDOF whenever BDOF is enabled at the SPS level (i.e. sps_bdof_enabled_flag is set to 1 at the SPS level).

The syntax element is coded in the PPS as follows:
if (sps_bdof_enabled_flag)
  slice_disable_bdof_flag
It is encoded as a 1-bit flag in the bitstream.
The semantics of the slice_disable_bdof_flag is as follows:
When slice_disable_bdof_flag is decoded as 1 in a slice header, where the slice contains either a group of tiles or a group of CTU rows within a tile, coding units in the slice will disable BDOF (i.e. bi-directional optical flow inter prediction shall not be performed for a regular merge mode coding unit). When sps_bdof_enabled_flag is 1 and slice_disable_bdof_flag is decoded as 0, coding units in the slice will enable BDOF (i.e.

bi-directional optical flow inter prediction shall be performed for sub-blocks of a regular merge mode coding unit).

Embodiment-3

In this embodiment, an encoder uses a method for detecting the presence of screen content in a current frame of video and uses that to set the pps_disable_dmvr_flag that was described in embodiment-1 to 1 or slice_disable_dmvr_flag that was described in embodiment-2 to 1 for a given access unit or slice respectively.

In one specific embodiment, an N-bit hash value is computed for blocks of 4×4 luma samples starting at all positions of the current frame or slice. An N-bit hash table is built where each entry of the table contains a count of 4×4 blocks that took a specific N-bit hash value. Across all hash table entries, the sum of all entries with a count value greater than 1 is computed. If this sum exceeds a pre-determined threshold value (where the threshold is usually computed as a certain percentage of the total number of sample positions), the current frame or slice is declared as containing screen content. Using this pre-analysis of the current frame or slice and the conclusion that it has screen content in at least a certain percentage area of the frame, pps_disable_dmvr_flag is set to 1 for the current frame or slice_disable_dmvr_flag is set to 1 for the current slice. And the current frame or the current slice is encoded to obtain the coded data for the current frame or the current slice, based on the conclusion that there is some screen content in at least a certain percentage area of the current frame or the current slice, or based on the value of pps_disable_dmvr_flag or slice_disable_dmvr_flag.

Embodiment-4

In this embodiment, an encoder performs sum of absolute transform differences (SATD) based cost computation on the prediction residuals obtained with and without DMVR. The SATD-based cost with and without DMVR for the coding units after recursion are accumulated separately across all coding units of a current frame. When the accumulated cost with DMVR is higher than the accumulated cost without DMVR, a decision is made to disable DMVR by setting the proposed pps_disable_dmvr_flag to 1 for the current frame, or by setting the proposed pps_disable_dmvr_flag to 1 for the current frame by re-encoding it, or by setting pps_disable_dmvr_flag to 1 for succeeding pictures in encoder order until the encoder either detects a scene change or encodes an intra-picture. And the current frame or succeeding picture is encoded to obtain the coded data for the current frame or succeeding picture, based on the conclusion that the accumulated cost with DMVR is higher than the accumulated cost without DMVR, or based on the value of pps_disable_dmvr_flag for the current frame or the succeeding picture. The term re-encoding refers actually to a second pass of encoding the current frame. DMVR was enabled initially during the first pass of a current frame, after accumulating the costs with and without DMVR (where with DMVR is normatively required when a current CU meets the conditions to apply DMVR). Now if the cost without DMVR is better at the frame level, the entire frame is now encoded again with DMVR disabled at the PPS level.

Figure 8:
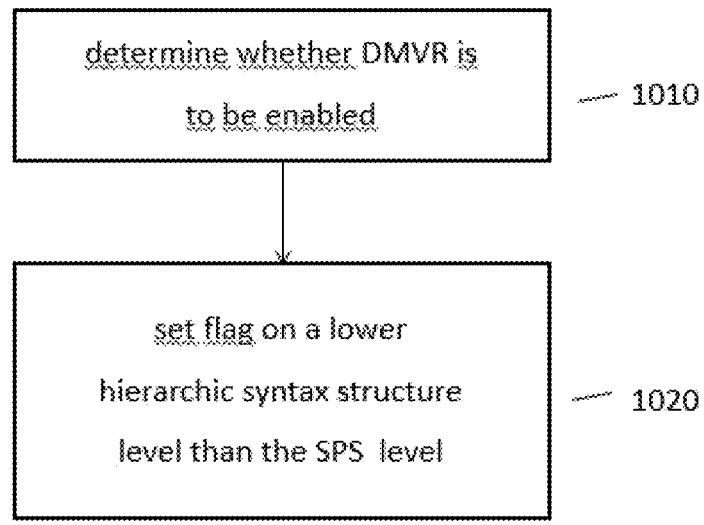
FIG. 8 illustrates a method of encoding a video bitstream according to an embodiment.
Figure 9:
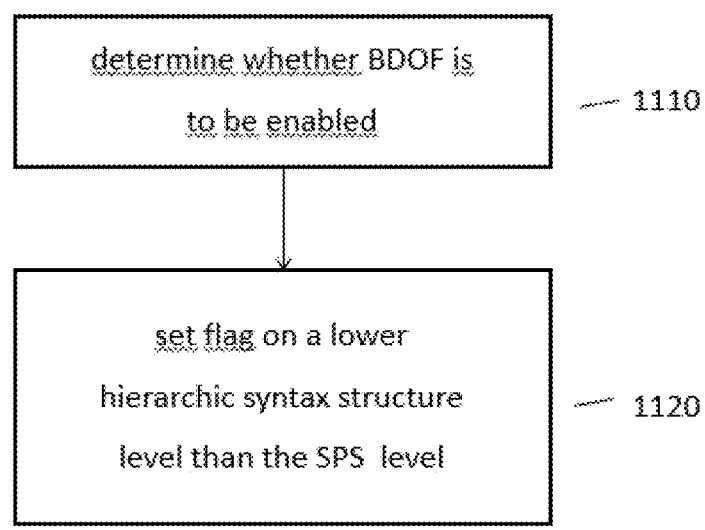
FIG. 9 illustrates a method of encoding a video bitstream according to another embodiment.

In particular, FIG. 8 illustrates a method of encoding a video bitstream comprising coded data for a plurality of pictures implemented in an encoding device according to an embodiment. At operation 1010, the device determines whether decoder motion vector refinement, DMVR, based inter bi-prediction is enabled for at least one region of a current picture of the plurality of pictures. At operation 1020, based on the result of the determination process, the device sets a value of a disabling flag (for example, a 1-bit flag) for DMVR on a hierarchic syntax structure level that is lower than the sequence parameter set, SPS, level. The value of the disabling flag specifies whether or not DMVR based inter bi-prediction is enabled for at least one region of the current picture Further, FIG. 9 illustrates a method of encoding a video bitstream comprising coded data for a plurality of pictures implemented in an encoding device according to an embodiment. The method comprises determining whether bi-directional optical flow, BDOF, inter prediction is enabled for at least one region of a current picture of the plurality of pictures, at operation 1110. Furthermore, the method comprises setting a value of a disabling flag (for example, a 1-bit flag) for BDOF on a lower hierarchic syntax structure level than the sequence parameter set level, SPS, at operation 1120, based on the outcome of the determining whether BDOF inter prediction is enabled, wherein the value of the disabling flag specifies whether or not BDOF inter prediction is enabled for at least one region of the current picture.

Figure 10:
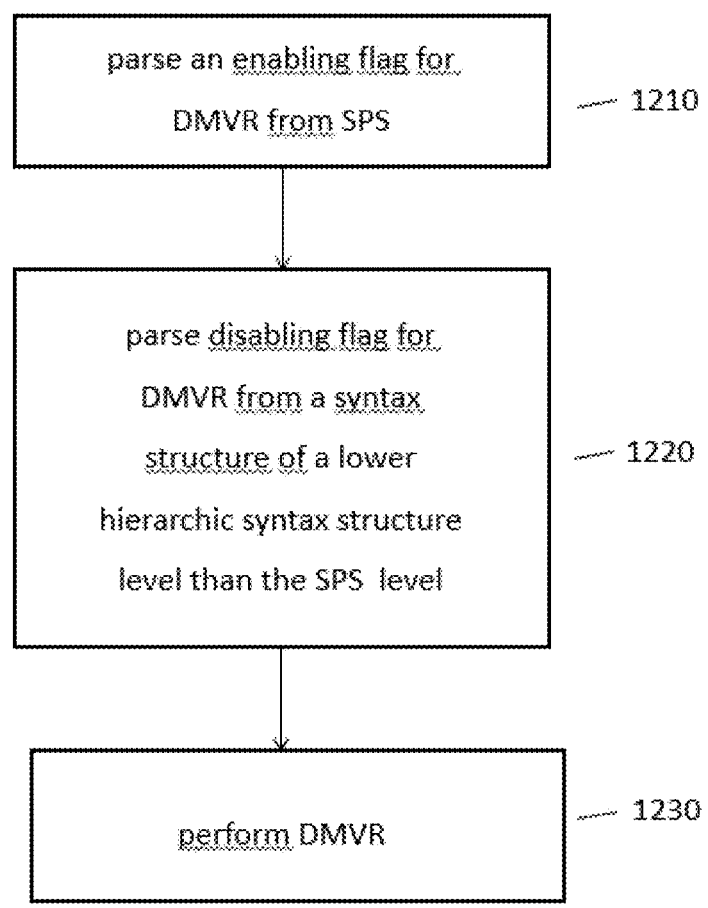
FIG. 10 illustrates a method of decoding a video bitstream according to an embodiment.

Similarly, methods of decoding a video bitstream are provided. In particular, FIG. 10 illustrates a method of decoding a video bitstream including coded data for a plurality of pictures implemented by a decoding device according to an embodiment. The decoding method according to an embodiment comprises parsing an enabling flag for decoder motion vector refinement, DMVR, from a sequence parameter set of the video bitstream, at operation 1210, wherein the enabling flag for DMVR specifies whether or not DMVR based inter bi-prediction is enabled for the plurality of pictures associated with the sequence parameter set. Further, the decoding method according to this example comprises parsing a disabling flag for DMVR from a syntax structure of a lower hierarchic syntax structure level than the sequence parameter set, SPS, level of the video bitstream, at operation 1220, wherein the disabling flag for DMVR specifies whether or not DMVR based inter bi-prediction is disabled for at least one region of a current picture associated with the syntax structure, wherein the current picture belongs to the plurality of pictures. Further, the decoding method according to an embodiment comprises performing DMVR based inter bi-prediction, at operation 1230, for a current block within at least one region of the current picture to obtain predicted sample values of the current block when at least one pre-defined condition is fulfilled, and wherein the at least one pre-defined condition comprises that the parsed value of the disabling flag specifies that DMVR based inter bi-prediction is enabled.

Figure 11:
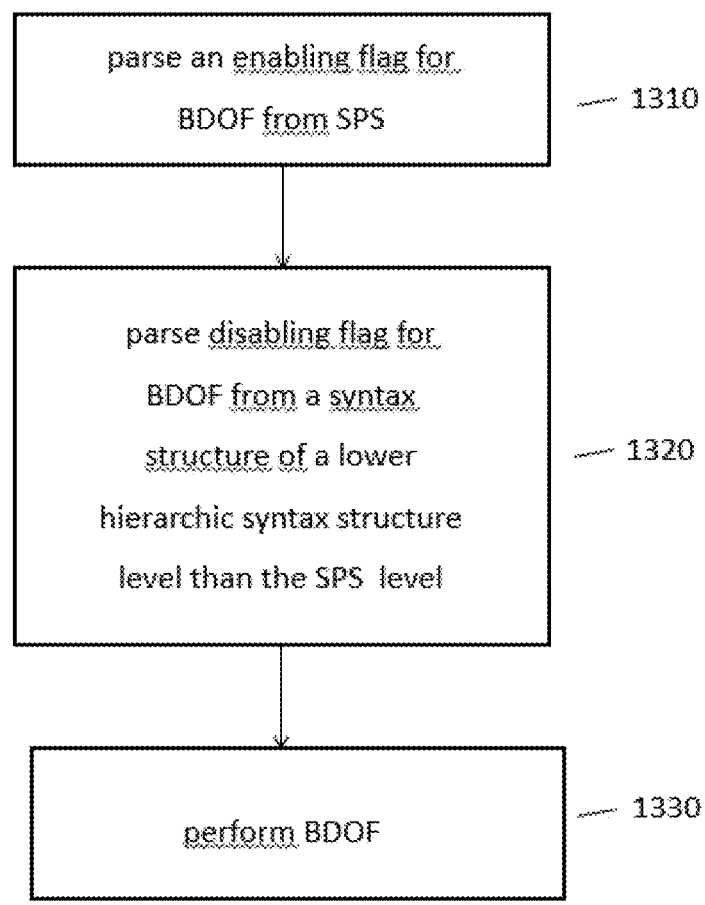
FIG. 11 illustrates a method of decoding a video bitstream according to another embodiment.

A similar procedure with respect to enabling or disabling bi-directional optical flow processing is provided, namely, a method of decoding a video bitstream, the video bitstream including coded data for a plurality of pictures, implemented by a decoding device as illustrated in FIG. 11. The decoding method according to this example comprises parsing an enabling flag for bi-directional optical flow, BDOF, from a sequence parameter set of the video bitstream, at operation 1310, wherein the enabling flag for BDOF specifies whether or not BDOF inter prediction is enabled for the plurality of pictures associated with the sequence parameter set and parsing a disabling flag for BDOF from a syntax structure of a lower hierarchic syntax structure level than the sequence parameter set, SPS, level of the video bitstream, at operation 1320. The disabling flag for BDOF specifies whether or not BDOF inter prediction is disabled for at least one region of a current picture associated with the syntax structure, wherein the current picture belongs to the plurality of pictures. According to this example, the method further comprises performing BDOF inter prediction for a current block within at least one region of the current picture, at operation 1330, to obtain predicted sample values of the current block when at least one pre-defined condition is fulfilled, and wherein the at least one pre-defined condition comprises that the parsed value of the disabling flag specifies that BDOF inter prediction is enabled.

In these methods the disabling flags may be set on the PPS level or the slice header level. These methods can be readily implemented in the apparatuses described above with reference to FIGS. 1a to 5 and, where appropriate, in one of the devices described in the following. Each of the devices described in the following with reference to FIGS. 12 to 15 may be combined with one or more of the other devices or may comprise or be comprised in one or more of the other devices where appropriate.

Figure 12:
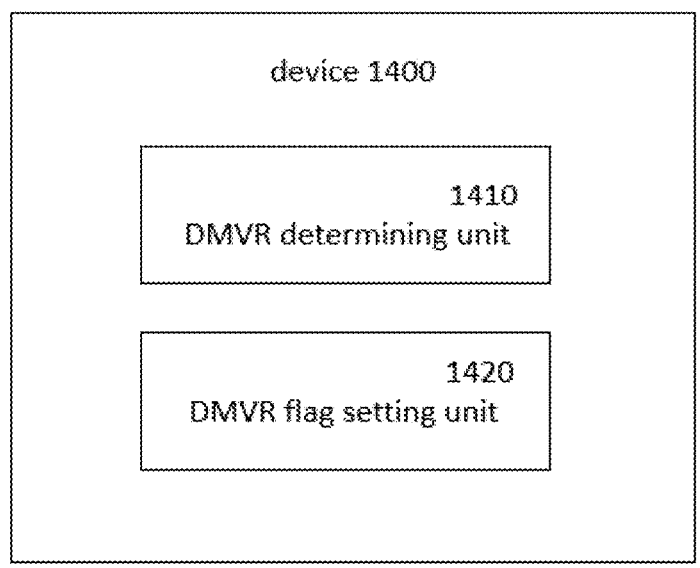
FIG. 12 illustrates a device for use in an image encoder according to an embodiment.

FIG. 12 illustrates a device 1400 for use in an image encoder configured for encoding a video bitstream comprising coded data for a plurality of pictures. The device 1400 according to the shown example comprises a decoder motion vector refinement, DMVR, determining unit 1410 configured for determining whether DMVR based inter bi-prediction is enabled for at least one region of a current picture of the plurality of pictures Further, the device 1400 comprises a DMVR flag setting unit 1420 configured for setting a value of a disabling flag for DMVR on a lower hierarchic syntax structure level (for example, the PPS level or the slice header level) than the sequence parameter set, SPS, level based on the outcome of the determining whether DMVR based inter bi-prediction is enabled, the value of the disabling flag specifying whether or not DMVR based inter bi-prediction is enabled for at least one region of the current picture. An enabling flag for DMVR on the SPS level, the enabling flag specifying whether or not DMVR based inter bi-prediction is enabled for the plurality of pictures, may also be set by the flag setting unit 1420 or another flag setting unit of the device 1400.

Figure 13:
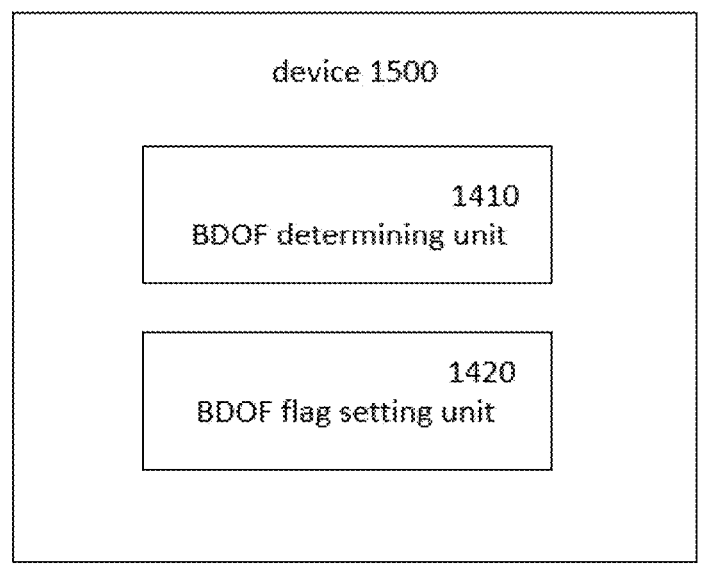
FIG. 13 illustrates a device for use in an image encoder according to another embodiment.

Similarly, it is provided a device 1500 for use in an image encoder configured for encoding a video bitstream comprising coded data for a plurality of pictures as illustrated in FIG. 13. The device 1500 comprises a bi-directional optical flow, BDOF, inter prediction determining unit 1510 configured for determining whether BDOF inter prediction is enabled for at least one region of a current picture of the plurality of pictures. Further, the device 1500 comprises a BDOF flag setting unit 1520 configured for setting a value of a disabling flag for BDOF on a lower hierarchic syntax structure level (for example, the PPS level or the slice header level) than the sequence parameter set level, SPS, based on the outcome of the determining whether BDOF inter prediction is enabled, the value of the disabling flag specifying whether or not BDOF inter prediction is enabled for at least one region of the current picture. An enabling flag for BDOF on the SPS level, the enabling flag specifying whether or not DMVR based inter bi-prediction is enabled for the plurality of pictures, may also be set by the flag setting unit 1520 or another flag setting unit of the device 1500.

Figure 14:
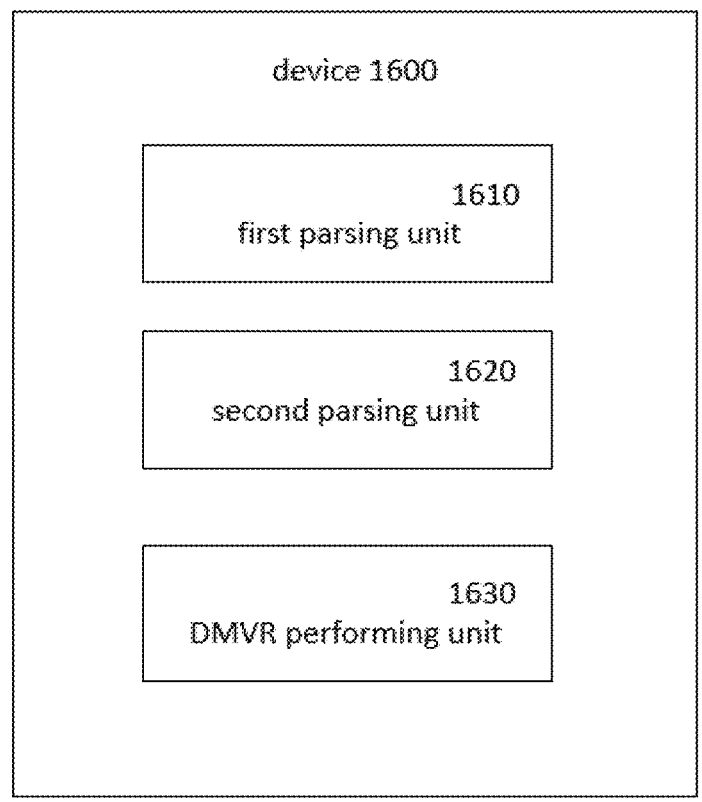
FIG. 14 illustrates a device for use in an image decoder according to an embodiment.

According to another embodiment, a device 1600 for use in an image decoder configured for decoding a video bitstream comprising coded data for a plurality of pictures is provided as illustrated in FIG. 14. The device 1600 comprises a first parsing unit 1610 configured for parsing an enabling flag for decoder motion vector refinement, DMVR, from a sequence parameter set of the video bitstream, wherein the enabling flag for DMVR specifies whether or not DMVR based inter bi-prediction is enabled for the plurality of pictures associated with the sequence parameter set. Further, the device 1600 comprises a second parsing unit 1620 configured for parsing a disabling flag for DMVR from a syntax structure of a lower hierarchic syntax structure level (for example, the PPS level or the slice header level) than the sequence parameter set, SPS, level of the video bitstream, wherein the disabling flag for DMVR specifies whether or not DMVR based inter bi-prediction is disabled for at least one region of a current picture associated with the syntax structure, wherein the current picture belongs to the plurality of pictures. Additionally, the device 1600 comprises a DMVR performing unit 1630 configured for performing DMVR based inter bi-prediction for a current block within at least one region of the current picture to obtain predicted sample values of the current block when at least one pre-defined condition is fulfilled, and wherein the at least one pre-defined condition comprises that the parsed value of the disabling flag specifies that DMVR based inter bi-prediction is enabled.

Figure 15:
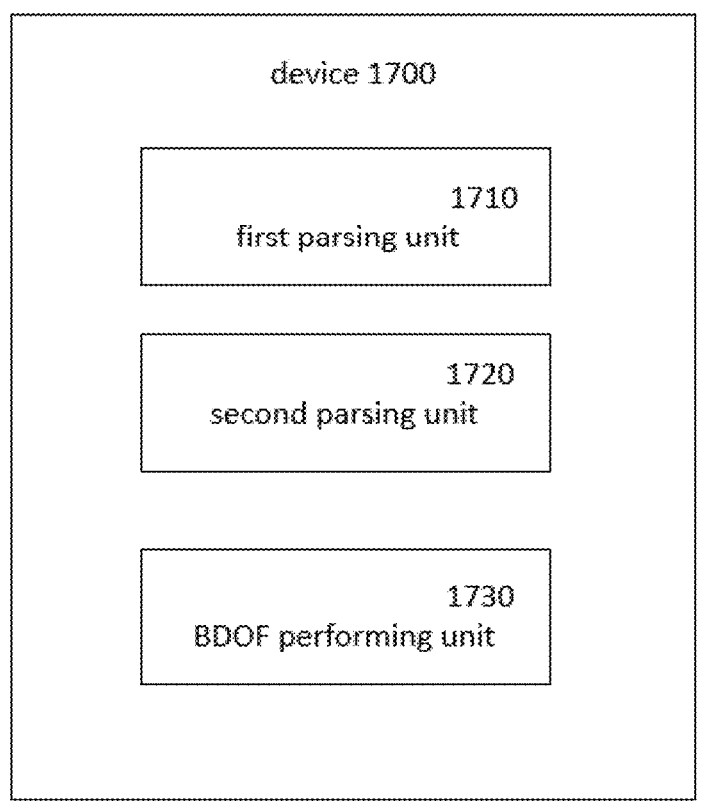
FIG. 15 illustrates a device for use in an image decoder according to another embodiment.

Similarly, it is provided a device 1700 for use in an image decoder configured for decoding a video bitstream comprising coded data for a plurality of pictures as illustrated in FIG. 15. The device 1700 comprises a first parsing unit 1710 configured for parsing an enabling flag for bi-directional optical flow, BDOF, from a sequence parameter set of the video bitstream, wherein the enabling flag for BDOF specifies whether or not BDOF inter prediction is enabled for the plurality of pictures associated with the sequence parameter set. Further, the device 1700 comprises a second parsing unit 1720 configured for parsing a disabling flag for BDOF from a syntax structure of a lower hierarchic syntax structure level (for example, the PPS level or the slice header level) than the sequence parameter set, SPS, level of the video bitstream, wherein the disabling flag for BDOF specifies whether or not BDOF inter prediction is disabled for at least one region of a current picture associated with the syntax structure, wherein the current picture belongs to the plurality of pictures. Additionally, the device 1700 comprises a BDOF performing unit 1730 configured for performing BDOF inter prediction for a current block within at least one region of the current picture to obtain predicted sample values of the current block when at least one pre-defined condition is fulfilled, and wherein the at least one pre-defined condition comprises that the parsed value of the disabling flag specifies that BDOF inter prediction is enabled.

Following is an explanation of the applications of the encoding method as well as the decoding method as shown in the above-mentioned embodiments, and a system using them.

Figure 16:
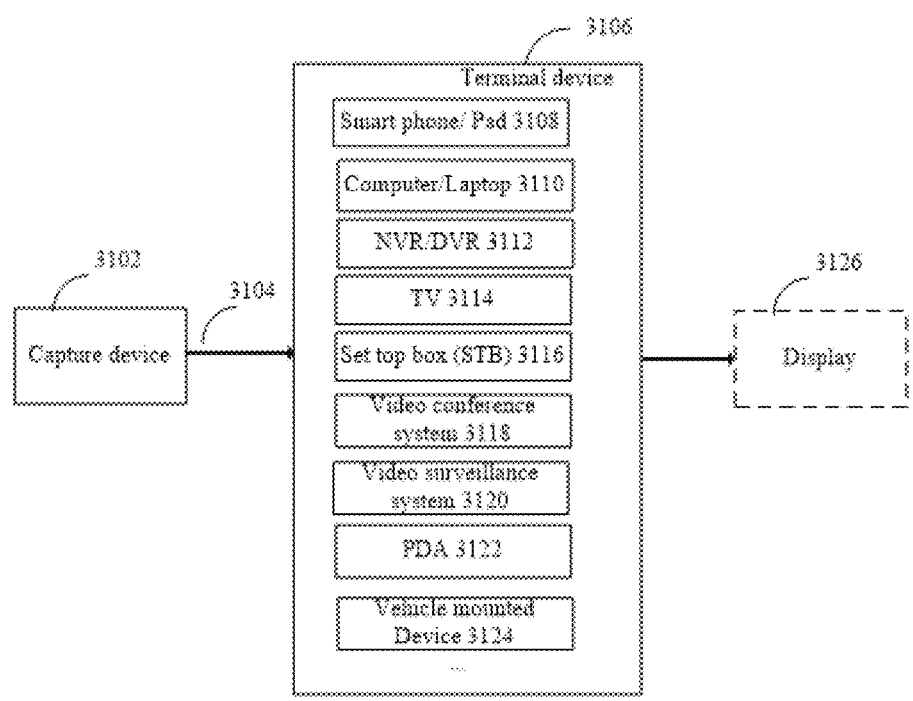
FIG. 16 is a block diagram showing an example structure of a content supply system 3100 which realizes a content delivery service.

FIG. 16 is a block diagram showing a content supply system 3100 for realizing content distribution service. This content supply system 3100 includes capture device 3102, terminal device 3106, and optionally includes display 3126. The capture device 3102 communicates with the terminal device 3106 over communication link 3104. The communication link may include the communication channel 13 described above. The communication link 3104 includes but not limited to WIFI, Ethernet, Cable, wireless (3G/4G/5G), USB, or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 310 receives and reproduces the encoded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, personal digital assistant (PDA) 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, network video recorder (NVR)/digital video recorder (DVR) 3112, TV 3114, personal digital assistant (PDA) 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

Figure 17:
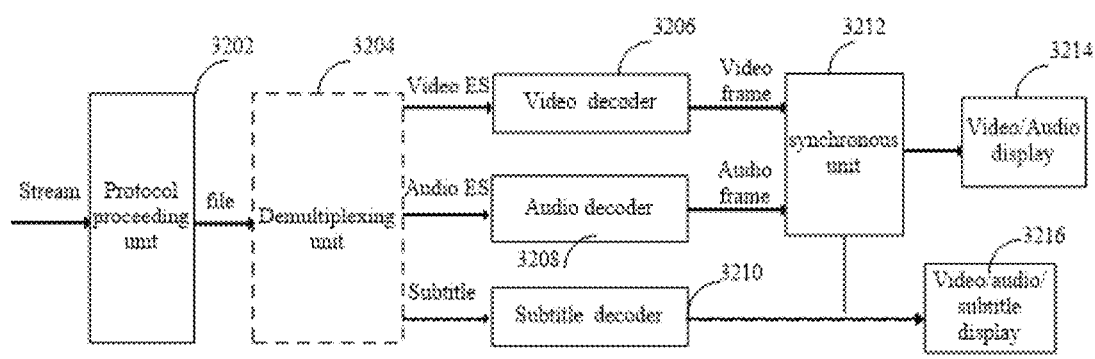
FIG. 17 is a block diagram showing a structure of an example of a terminal device.

FIG. 17 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and optionally subtitle are generated. The video decoder 3206, which includes the video decoder 30 as explained in the above mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. 17) before feeding it to the synchronous unit 3212. Similarly, the audio frame may store in a buffer (not shown in FIG. 17) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself If subtitle is included in the stream, the subtitle decoder 3210 decodes the subtitle, and synchronizes it with the video frame and the audio frame, and supplies the video/audio/subtitle to a video/audio/subtitle display 3216.

The present disclosure is not limited to the above-mentioned system, and either the picture encoding device or the picture decoding device in the above-mentioned embodiments can be incorporated into other system, for example, a car system.

Furthermore, the following embodiments are provided.

1. A method of decoding of a video bitstream implemented by a decoding device, wherein the video bitstream including coded data for a plurality of pictures, the decoding method comprising:
Parsing an enabling flag for decoder motion vector refinement based inter bi-prediction (DMVR) from a sequence parameter set of the video bitstream, where in the enabling flag for DMVR specifies whether DMVR is enabled to be performed for the plurality of pictures associated with the sequence parameter set;
Parsing a disabling flag for DMVR from a picture parameter set of the video bitstream, wherein the disabling flag for DMVR specifies whether DMVR is disabled to be performed for a current picture associated with the picture parameter set, wherein the current picture belongs to the plurality of pictures;
In case that at least two conditions are satisfied, performing DMVR for a current block within the current picture to obtain a predicted sample values of the current block, wherein the at least two conditions comprises the value of the enabling flag for DMVR specifies that DMVR is enabled to be performed for the plurality of pictures and the value of the disabling flag for DMVR specifies that DMVR is enabled to be performed for the current picture.

2. The decoding method of embodiment 1, wherein the decoding method further comprises:
In case that the value of the disabling flag for DMVR specifies that DMVR is disabled to be performed for the current picture, perform prediction operation other than DMVR for the current picture to obtain a predicted sample values of the current picture.

3. A method of decoding of a video bitstream implemented by a decoding device, wherein the video bitstream including coded data for a plurality of pictures, the decoding method comprising:

Parsing an enabling flag for Bi-directional optical flow (BDOF) from a sequence parameter set of the video bitstream, where in the enabling flag for BDOF specifies whether BDOF is enabled to be performed for the plurality of pictures associated with the sequence parameter set;

Parsing a disabling flag for BDOF from a picture parameter set of the video bitstream, wherein the disabling flag for BDOF specifies whether BDOF is disabled to be performed for a current picture associated with the picture parameter set, wherein the current picture belongs to the plurality of pictures;

In case that at least two conditions are satisfied, performing BDOF for a current block within the current picture to obtain a predicted sample values of the current block, wherein the at least two conditions comprises the value of the enabling flag for BDOF specifies that BDOF is enabled to be performed for the plurality of pictures and the value of the disabling flag for BDOF specifies that BDOF is enabled to be performed for the current picture.

4. The decoding method of embodiment 3, wherein the decoding method further comprises:

In case that the value of the disabling flag for BDOF specifies that BDOF is disabled to be performed for the current picture, perform prediction operation other than BDOF for the current picture to obtain a predicted sample values of the current picture.

5. A method of decoding of a video bitstream implemented by a decoding device, wherein the video bitstream including coded data for a plurality of pictures, the decoding method comprising:

Parsing an enabling flag for decoder motion vector refinement based inter bi-prediction (DMVR) from a sequence parameter set of the video bitstream, where in the enabling flag for DMVR specifies whether DMVR is enabled to be performed for the plurality of pictures associated with the sequence parameter set;

Parsing a disabling flag for DMVR from a slice header of the video bitstream, wherein the disabling flag for DMVR specifies whether DMVR is disabled to be performed for a current slice associated with the slice header, wherein the current slice belongs to a current picture within the plurality of pictures;

In case that at least two conditions are satisfied, performing DMVR for a current block within the current slice to obtain a predicted sample values of the current block, wherein the at least two conditions comprises the value of the enabling flag for DMVR specifies that DMVR is enabled to be performed for the plurality of pictures and the value of the disabling flag for DMVR specifies that DMVR is enabled to be performed for the current slice.

6. The decoding method of embodiment 5, wherein the decoding method further comprises:

In case that the value of the disabling flag for DMVR specifies that DMVR is disabled to be performed for the current slice, perform prediction operation other than DMVR for the current picture to obtain a predicted sample values of the current slice.

7. A method of decoding of a video bitstream implemented by a decoding device, wherein the video bitstream including coded data for a plurality of pictures, the decoding method comprising:

Parsing an enabling flag for Bi-directional optical flow (BDOF) from a sequence parameter set of the video bitstream, where in the enabling flag for BDOF specifies whether BDOF is enabled to be performed for the plurality of pictures associated with the sequence parameter set;

Parsing a disabling flag for BDOF from a slice header of the video bitstream, wherein the disabling flag for BDOF specifies whether BDOF is disabled to be performed for a current slice associated with the slice header, wherein the current slice belongs to a current picture within the plurality of pictures;

In case that at least two conditions are satisfied, performing BDOF for a current block within the current slice to obtain a predicted sample values of the current block, wherein the at least two conditions comprises the value of the enabling flag for BDOF specifies that BDOF is enabled to be performed for the plurality of pictures and the value of the disabling flag for BDOF specifies that BDOF is enabled to be performed for the current slice.

8. The decoding method of embodiment 7, wherein the decoding method further comprises:

In case that the value of the disabling flag for BDOF specifies that BDOF is disabled to be performed for the current slice, perform prediction operation other than BDOF for the current picture to obtain a predicted sample values of the current slice.

Benefits of the Proposed Disclosure

The proposed picture parameter set level or slice level disable flags for DMVR or BDOF enables non-normative algorithms to analyze the content to see whether the assumptions behind DMVR or BDOF are satisfied, and accordingly use the flag proposed to disable DMVR or BDOF. Thus any coding loss incurred by enabling DMVR or BDOF when the assumptions are not satisfied is avoided.

Mathematical Operators

The mathematical operators used in this application are similar to those used in the C programming language. However, the results of integer division and arithmetic shift operations are defined more precisely, and additional operations are defined, such as exponentiation and real-valued division. Numbering and counting conventions generally begin from 0, e.g., "the first" is equivalent to the 0-th, "the second" is equivalent to the 1-th, etc.

Arithmetic Operators

The following arithmetic operators are defined as follows:

+ Addition

− Subtraction (as a two-argument operator) or negation (as a unary prefix operator)

\* Multiplication, including matrix multiplication $x^y$ Exponentiation. Specifies x to the power of y. In other contexts, such notation is used for superscripting not intended for interpretation as exponentiation.

/ Integer division with truncation of the result toward zero. For example, 7/4 and −7/−4 are truncated to 1 and −7/4 and 7/−4 are truncated to −1.

÷ Used to denote division in mathematical equations where no truncation or rounding is intended.

$$\frac{x}{y}$$

Used to denote division in mathematical equations where no truncation or rounding is intended.

$$\sum_{i=x}^{y} f(i)$$

The summation of f(i) with i taking all integer values from x up to and including y.

x % y Modulus. Remainder of x divided by y, defined only for integers x and y with x>=0 and y>0.

Logical Operators

The following logical operators are defined as follows:
    x && y Boolean logical "and" of x and y
    x | y Boolean logical "or" of x and y
    ! Boolean logical "not"
    x ? y: z If x is TRUE or not equal to 0, evaluates to the value of y; otherwise, evaluates to the value of z.

Relational Operators

The following relational operators are defined as follows:
    > Greater than
    >= Greater than or equal to
    < Less than
    <= Less than or equal to
    == Equal to
    != Not equal to
    When a relational operator is applied to a syntax element or variable that has been assigned the value "na" (not applicable), the value "na" is treated as a distinct value for the syntax element or variable. The value "na" is considered not to be equal to any other value.

Bit-Wise Operators

The following bit-wise operators are defined as follows:
    & Bit-wise "and". When operating on integer arguments, operates on a two's complement representation of the integer value. When operating on a binary argument that contains fewer bits than another argument, the shorter argument is extended by adding more significant bits equal to 0.
    | Bit-wise "or". When operating on integer arguments, operates on a two's complement representation of the integer value. When operating on a binary argument that contains fewer bits than another argument, the shorter argument is extended by adding more significant bits equal to 0.
    ^ Bit-wise "exclusive or". When operating on integer arguments, operates on a two's complement representation of the integer value. When operating on a binary argument that contains fewer bits than another argument, the shorter argument is extended by adding more significant bits equal to 0.
    x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.
    x<<y Arithmetic left shift of a two's complement integer representation of x by y binary digits. This function is defined only for non-negative integer values of y. Bits shifted into the least significant bits (LSBs) as a result of the left shift have a value equal to 0.

Assignment Operators

The following arithmetic operators are defined as follows:
    = Assignment operator
    ++ Increment, i.e., x++ is equivalent to x=x+1; when used in an array index, evaluates to the value of the variable prior to the increment operation.
    -- Decrement, i.e., x-- is equivalent to x=x-1; when used in an array index, evaluates to the value of the variable prior to the decrement operation.
    += Increment by amount specified, i.e., x+=3 is equivalent to x=x+3, and x+=(-3) is equivalent to x=x+(-3).
    -= Decrement by amount specified, i.e., x-=3 is equivalent to x=x-3, and x-=(-3) is equivalent to x=x-(-3).

Range Notation

The following notation is used to specify a range of values:
    x=y . . . z x takes on integer values starting from y to z, inclusive, with x, y, and z being integer numbers and z being greater than y.

Mathematical Functions

The following mathematical functions are defined:

$$\mathrm{Abs}(x) = \begin{cases} x; & x >= 0 \\ -x; & x < 0 \end{cases}$$

Asin(x) the trigonometric inverse sine function, operating on an argument x that is in the range of −1.0 to 1.0, inclusive, with an output value in the range of −π÷2 to π÷2, inclusive, in units of radians Atan(x) the trigonometric inverse tangent function, operating on an argument x, with an output value in the range of −π÷2 to π÷2, inclusive, in units of radians $$\mathrm{Atan2}(y, x) = \begin{cases} \mathrm{Atan}\left(\frac{y}{x}\right); & x > 0 \\ \mathrm{Atan}\left(\frac{y}{x}\right) + \pi; & x < 0 \,\&\&\, y >= 0 \\ \mathrm{Atan}\left(\frac{y}{x}\right) - \pi; & x < 0 \,\&\&\, y < 0 \\ +\frac{\pi}{2} & x == 0 \,\&\&\, y >= 0 \\ -\frac{\pi}{2} & \text{otherwise} \end{cases}$$

Ceil(x) the smallest integer greater than or equal to x.

$$\mathrm{Clip1}_Y(x) = \mathrm{Clip3}(0, (1 << \mathrm{BitDepth}_Y) - 1, x)$$

$$\mathrm{Clip1}_C(x) = \mathrm{Clip3}(0, (1 << \mathrm{BitDepth}_C) - 1, x)$$

$$\mathrm{Clip3}(x, y, z) = \begin{cases} x; & z < x \\ y; & z > y \\ z; & \text{otherwise} \end{cases}$$

Cos(x) the trigonometric cosine function operating on an argument x in units of radians.

Floor(x) the largest integer less than or equal to x.

$$GetCurrMsb(a, b, c, d) = \begin{cases} c + d; & b - a >= d/2 \\ c - d; & a - b > d/2 \\ c; & \text{otherwise} \end{cases}$$

Ln(x) the natural logarithm of x (the base-e logarithm, where e is the natural logarithm base constant 2.718 281 828 . . . ).

Log 2(x) the base-2 logarithm of x.

Log 10(x) the base-10 logarithm of x.

$$Min(x, y) = \begin{cases} x; & x <= y \\ y; & x > y \end{cases}$$

$$Max(x, y) = \begin{cases} x; & x >= y \\ y; & x < y \end{cases}$$

Round(x)=Sign(x)*Floor(Abs(x)+0.5)

$$Sign(x) = \begin{cases} 1; & x > 0 \\ 0; & x == 0 \\ -1; & x < 0 \end{cases}$$

Sin(x) the trigonometric sine function operating on an argument x in units of radians Sqrt(x)=$\sqrt{x}$ Swap(x,y)=(y,x)

Tan(x) the trigonometric tangent function operating on an argument x in units of radians Order of Operation Precedence When an order of precedence in an expression is not indicated explicitly by use of parentheses, the following rules apply:

Operations of a higher precedence are evaluated before any operation of a lower precedence.

Operations of the same precedence are evaluated sequentially from left to right.

The table below specifies the precedence of operations from highest to lowest; a higher position in the table indicates a higher precedence.

For those operators that are also used in the C programming language, the order of precedence used in this Specification is the same as used in the C programming language.

TABLE

| Operation precedence from highest (at top of table) to lowest (at bottom of table) |
|---|
| operations (with operands x, y, and z) |
| "x++", "x− −" |
| "!x", "−x" (as a unary prefix operator) |
| $x^y$ |
| "x * y", "x / y", "x ÷ y", "x/y", "x % y" |

TABLE-continued

| Operation precedence from highest (at top of table) to lowest (at bottom of table) |
|---|
| operations (with operands x, y, and z) |
| "x + y", "x − y" (as a two-argument operator), "$\sum_{i=x}^{y} f(i)$" |
| "x << y", "x >> y" |
| "x < y", "x <= y", "x > y", "x >= y" |
| "x = = y", "x != y" |
| "x & y" |
| "x \| y" |
| "x && y" |
| "x \|\| y" |
| "x ? y : z" |
| "x..y" |
| "x = y", "x += y", "x −= y" |

Text Description of Logical Operations

In the text, a statement of logical operations as would be described mathematically in the following form:

if( condition 0 )
  statement 0
else if( condition 1 )
  statement 1
...
else /* informative remark on remaining condition */
  statement n may be described in the following manner:

... as follows / ... the following applies:
- If condition 0, statement 0
- Otherwise, if condition 1, statement 1
- ...
- Otherwise (informative remark on remaining condition), statement n Each "If . . . Otherwise, if . . . Otherwise, . . . " statement in the text is introduced with " . . . as follows" or " . . . the following applies" immediately followed by "If . . . ". The last condition of the "If . . . Otherwise, if . . . Otherwise, . . . " is always an "Otherwise, . . . ". Interleaved "If . . . Otherwise, if . . . Otherwise, . . . " statements can be identified by matching " . . . as follows" or " . . . the following applies" with the ending "Otherwise, . . . ".

In the text, a statement of logical operations as would be described mathematically in the following form:

```
if( condition 0a && condition 0b )
    statement 0
else if( condition 1a || condition 1b )
    statement 1
...
else
    statement n
may be described in the following manner:
... as follows / ... the following applies:
-  If all of the following conditions are true, statement 0:
    -  condition 0a
    -  condition 0b
-  Otherwise, if one or more of the following conditions are true, statement 1:
    -  condition 1a
    -  condition 1b
-  ...
-  Otherwise, statement n
```

In the text, a statement of logical operations as would be described mathematically in the following form:

```
if( condition 0 )
    statement 0
if( condition 1 )
    statement 1
may be described in the following manner:
    When condition 0, statement 0
    When condition 1, statement 1
```

Although embodiments of the disclosure have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general, only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g. residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The invention claimed is:

1. A method of video encoding, comprising:
   determining whether decoder motion vector refinement (DMVR) based inter bi-prediction is enabled for at least one region of a current picture of a plurality of pictures, including:
   calculating a first sum of costs based on prediction residuals of coding units of the at least one region without performing decoder motion vector refinement based inter bi-prediction;
   calculating a second sum of costs based on prediction residuals of the coding units of the at least one region with performing motion vector refinement; and
   determining using an initial motion vector (MV) pair for inter bi-prediction when the second sum is higher than the first sum;
   setting a value of a disabling flag for DMVR on a hierarchic syntax structure level lower than a sequence parameter set (SPS) level based on whether DMVR based inter bi-prediction is enabled, the value of the disabling flag specifying whether the DMVR based inter bi-prediction is enabled for the at least one region of the current picture and the at least one region of the current picture includes a current slice, and
   performance of the DMVR for the at least one region is conditioned on a parsed value of an enabling flag specifies that DMVR is enabled for the current picture, a parsed value of the disabling flag specifies that DMVR is enabled for the current slice, and whether initial dis-similarity between two prediction blocks obtained using the initial motion vector (MV) pair is less than a pre-determined per-sample threshold.

2. The method of claim 1, wherein the at least one region of the current picture is the current picture and the disabling flag is set on a picture parameter set (PPS) level.

3. The method of claim 1, wherein the at least one region of the current picture is a slice of the current picture and the disabling flag is set on a slice header level.

4. The method of claim 1, further comprising determining that DMVR based inter bi-prediction is disabled when at least one pre-defined condition is fulfilled.

5. The method of claim 4, further comprising determining motion vector differences with respect to the at least one region of the current picture and at least one region of a reference picture on one side of at least one region of the current picture and at least one region of another reference picture on the other side of the at least one region of the current picture, and wherein the at least one pre-defined condition comprises that the determined motion vector differences do not have both the same absolute values and opposite signs.

6. The method of claim 4, wherein the determining whether DMVR based inter bi-prediction is enabled for the at least one region comprises: determining whether screen content is present in the at least one region of the current picture, and wherein the at least one pre-defined condition comprises that it is determined that screen content is present in the at least one region of the current picture.

7. The method of claim 6, wherein determining whether screen content is present in the at least one region of the current picture comprises:
   calculating N-bit hash values for blocks of the at least one region of the current picture starting from each of M samples of the at least one region of the current picture, respectively, wherein N, M and K are integer values;
   determining a hash table with K entries, wherein each of the K entries contains a count value of blocks for which N-bit hash values are calculated that are equal to a pre-defined value;
   determining a sum of the entries comprising a count value larger than 1; and
   determining that screen content is present in the at least one region of the current picture when the determined sum of the entries exceeds a pre-defined threshold.

8. The method of claim 7, wherein the blocks comprise 4×4 samples.

9. The method of claim 7, wherein the pre-defined threshold represents a pre-defined percentage of a total number of the samples of the at least one region of the current picture.

10. The method of claim 2, wherein the costs are absolute transform differences (SATD) based costs.

11. The method of claim 2, further comprising: determining that DMVR inter bi-prediction is not to be enabled for succeeding pictures of the current picture when the second sum is higher than the first sum, wherein the at least one region of the current picture is the current picture.

12. The method of claim 1, further comprising setting the enabling flag for DMVR on the SPS level, the enabling flag specifying whether or not the DMVR based inter bi-prediction is enabled for the plurality of pictures.

13. A method of video decoding, comprising:
   parsing an enabling flag for decoder motion vector refinement (DMVR) from a sequence parameter set (SPS) of a video bitstream, wherein the enabling flag for DMVR specifies whether or not DMVR based inter bi-prediction is enabled for a plurality of pictures associated with the SPS, the enabling flag for DMVR is determined using an initial motion vector (MV) pair for inter bi-prediction when a second sum is higher than a first sum, the first sum being calculated based on prediction residuals of coding units of at least one region of a current picture without performing decoder motion vector refinement based inter bi-prediction, the second sum being calculated based on prediction residuals of the coding units of the at least one region with performing motion vector refinement;
   parsing a disabling flag for DMVR from a syntax structure of a hierarchic syntax structure level lower than a SPS level of the video bitstream, wherein the disabling flag for DMVR specifies whether DMVR based inter bi-prediction is disabled for the at least one region of the current picture associated with the syntax structure, wherein the current picture belongs to the plurality of pictures and the at least one region of the current picture includes a current slice; and
   performing the DMVR based inter bi-prediction for a current block within the at least one region of the current picture to obtain predicted sample values of the current block when at least one pre-defined condition is fulfilled, and wherein the at least one pre-defined condition comprises that a parsed value of the enabling flag specifies that DMVR based inter bi-prediction is enabled for the current picture, a parsed value of the disabling flag specifies that DMVR based inter bi-prediction is enabled for the current slice, and initial dis-similarity between two prediction blocks obtained using the initial motion vector (MV) pair is less than a pre-determined per-sample threshold.

14. The method of claim 13, wherein the at least one region of the current picture is the current picture, the syntax structure is a picture parameter set (PPS).

15. The method of claim 13, wherein the at least one region of the current picture is a slice of the current picture, the syntax structure is a slice header.

16. The method of claim 13, wherein DMVR based inter bi-prediction is performed for the current block when a parsed value of the enabling flag for DMVR specifies that DMVR is enabled.

17. A device for video encoding, comprising:

at least one processor;

a decoder motion vector refinement (DMVR) determining unit configured by the at least one processor to determine whether DMVR based inter bi-prediction is enabled for at least one region of a current picture of a plurality of pictures, including:

calculating a first sum of costs based on prediction residuals of coding units of the at least one region without performing decoder motion vector refinement based inter bi-prediction;

calculating a second sum of costs based on prediction residuals of the coding units of the at least one region with performing motion vector refinement; and determining using an initial motion vector (MV) pair for inter bi-prediction when the second sum is higher than the first sum; and a first DMVR flag setting unit configured by the at least one processor to set a value of a disabling flag for DMVR on a hierarchic syntax structure level lower than a sequence parameter set (SPS) level based on whether DMVR based inter bi-prediction is enabled, the value of the disabling flag specifying whether DMVR based inter bi-prediction is enabled for the at least one region of the current picture and the at least one region of the current picture includes a current slice, and performance of the DMVR for the at least one region is conditioned on a parsed value of an enabling flag specifies that DMVR is enabled for the current picture, a parsed value of the disabling flag specifies that DMVR is enabled for the current slice, and whether initial dis-similarity between two prediction blocks obtained using the initial motion vector (MV) pair is less than a pre-determined per-sample threshold.

18. A device for video decoding, comprising:

at least one processor;

a first parsing unit configured by the at least one processor to parse an enabling flag for decoder motion vector refinement (DMVR) from a sequence parameter set (SPS) of a video bitstream, wherein the enabling flag for DMVR specifies whether DMVR based inter bi-prediction is enabled for a plurality of pictures associated with the SPS, the enabling flag for DMVR is determined using an initial motion vector (MV) pair for inter bi-prediction when a second sum is higher than a first sum, the first sum being calculated based on prediction residuals of coding units of at least one region of a current picture without performing decoder motion vector refinement based inter bi-prediction, the second sum being calculated based on prediction residuals of the coding units of the at least one region with performing motion vector refinement;

a second parsing unit configured by the at least one processor to parse a disabling flag for DMVR from a syntax structure of a hierarchic syntax structure level lower than a SPS level of the video bitstream, wherein the disabling flag for DMVR specifies whether DMVR based inter bi-prediction is disabled for the at least one region of the current picture associated with the syntax structure, wherein the current picture belongs to the plurality of pictures and the at least one region of the current picture includes a current slice; and a DMVR performing unit configured by the at least one processor to perform DMVR based inter bi-prediction for a current block within the at least one region of the current picture to obtain predicted sample values of the current block when at least one pre-defined condition is fulfilled, and wherein the at least one pre-defined condition comprises that a parsed value of the enabling flag specifies that DMVR based inter bi-prediction is enabled for the current picture, a parsed value of the disabling flag specifies that DMVR based inter bi-prediction is enabled for the current slice, and initial dis-similarity between two prediction blocks obtained using the initial motion vector (MV) pair is less than a pre-determined per-sample threshold.

19. A non-transitory storage medium which includes an encoded bitstream decoded by an image decoding device, the encoded bitstream being generated by dividing a frame of a video signal or an image signal into a plurality blocks, and including a plurality of syntax elements, wherein the plurality of syntax elements comprises a disabling flag for DMVR of claim 13.

* * * * *